(12) United States Patent
Hamada et al.

(10) Patent No.: US 7,443,133 B2
(45) Date of Patent: Oct. 28, 2008

(54) FUEL CELL MANAGEMENT SYSTEM AND AUDIO SYSTEM PROVIDED WITH THE MANAGEMENT SYSTEM

(75) Inventors: Seiji Hamada, Osaka (JP); Hirotsugu Fusayasu, Uji (JP); Hiroto Inoue, Hirakata (JP); Shoichi Mimura, Hirakata (JP); Miyoko Irikiin, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 287 days.

(21) Appl. No.: 10/932,243

(22) Filed: Sep. 2, 2004

(65) Prior Publication Data

US 2005/0093506 A1 May 5, 2005

(30) Foreign Application Priority Data

Sep. 4, 2003 (JP) ............................ 2003-312318

(51) Int. Cl.
*H01M 10/44* (2006.01)
*H01M 8/00* (2006.01)
*H01M 8/04* (2006.01)
*H01M 10/48* (2006.01)

(52) U.S. Cl. ..................... 320/101; 429/12; 429/13; 429/22; 429/90; 429/91; 429/92

(58) Field of Classification Search ............. 320/101; 429/12, 13, 22, 90–92; 700/286; 702/108
See application file for complete search history.

(56) References Cited

U.S. PATENT DOCUMENTS 6,522,955 B1 * 2/2003 Colborn ................. 700/286

FOREIGN PATENT DOCUMENTS

JP 2002-161997 6/2002

* cited by examiner

*Primary Examiner*—Akm Enayet Ullah
*Assistant Examiner*—Richard V Muralidar
(74) *Attorney, Agent, or Firm*—Wenderoth, Lind & Ponack, L.L.P.

(57) ABSTRACT

A management information display unit that is able to form management information for managing the power supply state of fuel cells and displays the management information while allowing the management information to be identified as to which electronic device pertains to the management information based on identification information inputted from a plurality of electronic devices that are able to output the formed management information in correlation with the identification information of the fuel cell, and an information transmitting part for transmitting the identification information and the management information while allowing the information to be inputted to the management information display unit are provided.

16 Claims, 13 Drawing Sheets

FUEL CELL MANAGEMENT SYSTEM AND AUDIO SYSTEM PROVIDED WITH THE MANAGEMENT SYSTEM

BACKGROUND OF THE INVENTION

The present invention relates to a fuel cell management system for an electronic device with a fuel cell installed and operates on a power supplied from the fuel cell, the system managing the power supply state of the fuel cell.

Fossil fuels have widely been used as energy sources for electric power production and automobiles. However, from the viewpoint of the problems of environmental disruption and fuel exhaustion, there is a growing demand for a clean inexhaustible energy source that substitutes for the fossil fuels.

Accordingly, the fuel cell has attracted increasing attention in recent years. It can be said that the fuel cell is a very clean cell since it can produce electrical energy through a chemical reaction of hydrogen with oxygen and discharges none of poisonous substances, greenhouse gases and the like. Therefore, researches and development of such the fuel cell have been actively carried out (refer to, for example, Japanese unexamined patent publication No. 2002-161997), and the fuel cell is expected to be applied to large-scale power plants, private power generations and automobile power sources.

Furthermore, size reduction of fuel cells has been promoted through the recent researches and development, and installation of fuel cells in domestic electrical appliances (electronic devices) and portable electronic devices is on the way to achievement. In the case where the conventional primary battery (cell) is used, the battery itself is required to be replaced when its residual quantity depletes, and it is impossible to partially replenish it. Therefore, in order to prevent battery rundown, the user is required to carry a lot of batteries. Moreover, the secondary battery (cell) requires recharging, a place with a charger and a power outlet and also much time for the recharging.

However, achieving the installation of a fuel cell enables the fuel cell to substitute for the conventional primary batteries represented by the alkaline battery and the manganese battery and the secondary batteries represented by the nickel-cadmium battery, the nickel metal-hydride battery and the lithium-ion battery. The energy density of the fuel cell can be expected to be several times that of the lithium-ion secondary battery, and the cell itself is not required to be replaced since it is only required to be replenished with a fuel from the outside even when the cell residual quantity runs out. Moreover, the fuel cell needs neither device nor place for charging dissimilarly to the secondary battery, and it is possible to immediately use the fuel cell upon fuel replenishment. Therefore, the user's convenience is remarkably improved.

SUMMARY OF THE INVENTION

As described above, the fuel cell is very useful as a power source for the domestic electrical appliances and the portable electronic devices, and a variety of electronic devices with such the fuel cells installed are expected to increase. However, because the fuel for generating hydrogen is a flammable fuel of methanol or the like and is accompanied by the generation of heat and water, the user is required to handle it safely and easily.

However, there is a problem that, when a plurality of electronic devices employing the fuel cells exist, the electronic devices are required to be individually managed for the management of the fuel cells of the electronic devices.

Referring to such the electronic device in which the fuel cell is installed by way of a concrete example, for example, an audio system as a representative of the domestic electrical appliance has conventionally had a demand for arranging each of the speaker components provided for the audio system freely (in a free layout) in a room. However, wiring for connecting the main audio component to each of the speaker components has been indispensable for transmitting the audio signal outputted from the main audio component to each of the speaker components, and this has been an obstacle in the free layout of the speaker components.

In order to achieve such a free layout, it is required to adopt wireless communications that obviate the need for the wiring between the main audio component and each of the speaker components and provide each of the speaker components with a power source for the wireless communications. However, in the case where the lithium-ion battery of the secondary battery is used as such the power source, a period during which the cell can be continuously used by one-time charging is comparatively short due to a limitation on the charge capacity. This leads to an increased frequency of battery charging, which cannot be regarded as practicable. Therefore, it can be considered to install a fuel cell having a characteristic that the period during which the cell can be continuously used by one-time fuel replenishment is longer than that of the lithium-ion battery (i.e., a characteristic that energy density is high) in each of the speaker components for the achievement of the wireless communications.

However, if the fuel cell is installed in each of the speaker components, there is a problem that the free layout conversely makes the management of the fuel cells difficult because of the feature that the information to be managed in each of the installed fuel cells is large and the fact that the plurality of speaker components are provided.

Accordingly, the object of the present invention is to solve the aforementioned problems and provide a fuel cell management system capable of comprehensively and efficiently managing the power supply state of a fuel cell installed in an electronic device, which has the fuel cell installed and operate on a power supplied from the fuel cell.

In order to accomplish the aforementioned object, the present invention is constructed as follows.

According to a first aspect of the present invention, there is provided a fuel cell management system comprising:

a plurality of electronic devices, each of which is operated with an electric power supplied from an installed fuel cell, possesses peculiar identification information for identifying the respective electronic devices each other, for forming management information for managing a power supply state of the installed fuel cell and for outputting the formed management information in correlation with the identification information, a management information display unit for receiving the identification information and the management information outputted from each of the electronic devices and displaying the management information while allowing the management information to be identified as to which electronic device of the electronic devices pertains to the management information on basis of the received identification information; and an information transmitting part for transmitting the identification information and the management information outputted from each of the electronic devices while allowing the information to be inputted to the management information display unit, whereby the power supply state of the fuel cell in each of the electronic devices is displayed on the management information display unit on basis of the inputted management information for managing each of the fuel cells.

According to a second aspect of the present invention, there is provided a fuel cell management system as defined in the first aspect, wherein each of the electronic devices comprises an electronic device control section, which has a management information forming section for forming the management information according to the power supply state of the fuel cell in each of the electronic devices and an information output section for outputting the management information in correlation with the identification information to the management information display unit via the information transmitting part.

According to a third aspect of the present invention, there is provided a fuel cell management system as defined in the second aspect, wherein the management information display unit comprises:

an information input section for inputting the identification information and the management information via the information transmitting part;

an identification section for identifying the inputted management information as to which electronic device of the electronic devices pertains to the management information on basis of the inputted identification information; and a display section for displaying the management information while allowing the management information to be identified as to which electronic device of the electronic devices pertains to the management information.

According to a fourth aspect of the present invention, there is provided a fuel cell management system as defined in the third aspect, wherein the management information includes at least one piece of information of a residual quantity of fuel storage of the installed fuel cell, an output voltage in supplying the electric power, a temperature or humidity of the fuel cell and a leakage warning of the fuel, each of the electronic device control sections further has a detection section for detecting at least one piece of the information so that the management information is formed in the management information forming section on basis of the information detected by the detecting section.

According to a fifth aspect of the present invention, there is provided a fuel cell management system as defined in the second aspect, wherein the management information includes at least one piece of information of a fueling frequency of the installed fuel cell, an operating time of the fuel cell from a latest fueling time and a specific fuel consumption of the fuel, and each of the management information forming sections further has a calculation section for calculating at least one piece of the information.

According to a sixth aspect of the present invention, there is provided a fuel cell management system as defined in the fourth aspect, wherein each of the electronic device control sections forms the management information in the management information forming section when the detection section detects that the residual quantity of fuel storage becomes equal to or smaller than a prescribed quantity, a fluctuation of the output voltage becomes equal to or greater than a prescribed value, the temperature becomes equal to or higher than a prescribed temperature, the humidity becomes equal to or higher than a prescribed humidity or the fuel leakage occurs, outputs the formed management information from the information output section and transmits the management information to the management information display unit via the information transmitting part.

According to a seventh aspect of the present invention, there is provided a fuel cell management system as defined in the second aspect, wherein the management information display unit further comprises a request signal output section for outputting a request signal for individually requesting each of the electronic device control sections to transmit the management information, and each of the electronic device control sections further comprises a request signal input section to which the request signal is inputted, so that each of the electronic device control sections output the management information formed in the management information forming section from the information output section while allowing the management information to be inputted to the management information display unit on basis of the request signal that is outputted from the request signal output section and inputted to the request signal input section via the information transmitting part.

According to an eighth aspect of the present invention, there is provided a fuel cell management system as defined in the second aspect, wherein each of the electronic device control sections forms the management information in the management information forming section on basis of power turning-on or turning-off operation of the electronic device and outputs the formed management information from the information output section while allowing the management information to be inputted to the management information display unit.

According to a ninth aspect of the present invention, there is provided a fuel cell management system as defined in the second aspect, wherein the management information display unit comprises a stop signal output section for outputting a stop signal for stopping the operation of the electronic device identified by the identification information on basis of the inputted management information via the information transmitting part.

According to a tenth aspect of the present invention, there is provided a fuel cell management system as defined in the second aspect, wherein the management information display unit further comprises a management information storage section for retrievably storing the inputted management information so that the management information display unit displays the management information of the electronic device stored in the storage section in place of the management information to be inputted when the management information is not inputted from the electronic device via the information transmitting part.

According to an eleventh aspect of the present invention, there is provided a fuel cell management system as defined in the second aspect, wherein the information transmitting part is wireless communication part.

According to a twelfth aspect of the present invention, there is provided a fuel cell management system as defined in the second aspect, wherein the identification information is an IP address.

According to a thirteenth aspect of the present invention, there is provided a fuel cell management system as defined in the second aspect, wherein the management information display unit is operable to output audio sounds correlated with the management information.

According to a fourteenth aspect of the present invention, there is provided a fuel cell management system as defined in the second aspect, wherein the management information display unit is operable to display a where to make contact of a dealer or repairer of the electronic devices or the fuel cells together with the management information.

According to a fifteenth aspect of the present invention, there is provided an audio system having a plurality of speaker components and a main audio component for outputting audio signals to each of the speaker components while allowing the signals to be reproduced by each of the speaker components, wherein the audio system comprising the fuel cell management system defined in the second aspect using the speaker components as the electronic devices with the management information display unit provided for the main audio component.

According to a sixteenth aspect of the present invention, there is provided an audio system as defined in the fifteenth aspect, wherein the information transmitting part transmits the management information from each of the speaker components to the main audio component and transmits the audio signals from the main audio component to each of the speaker components.

According to a seventeenth aspect of the present invention, there is provided a audio system as defined in the sixteenth aspect, wherein the main audio component further comprises an operation control section for forming and outputting operation control information for operation control of the fuel cell installed in each of the speaker components on basis of the management information, each of the speaker components further comprises a secondary battery for backup of power necessary for transmitting the management information between each of the electronic device control sections and the main audio component, the management information includes information of a residual quantity of accumulated electricity of the secondary battery of the fuel cells, and the operation control section outputs an instruction signal for charging the secondary battery with electric power generated by the fuel cell as the operation control information on basis of the information of the residual quantity of the accumulated electricity of the secondary battery inputted from the electronic device control section via the information transmitting part and a power generation load estimate of the fuel cell on basis of the audio signals transmitted to the electronic device control section.

According to an eighteenth aspect of the present invention, there is provided an audio system as defined in the seventeenth aspect, wherein the operation control section of the main audio component transmits the operation control information together with the audio signals to the electronic device control section of each of the speaker components via the information transmitting parts.

According to the first aspect of the present invention, in the fuel cell management system, the management information, which is the information for managing the power supply state of the installed fuel cell, can be outputted from each of the electronic devices in which the fuel cell is installed. Besides the electronic devices from which the management information is outputted, there is provided the management information display unit to which each pieces of the outputted management information can be inputted, and the management information can be displayed on the management information display unit. With this arrangement, the fuel cells installed in the electronic devices can be comprehensively managed on the management information display unit without individually managing the information by each of the electronic devices.

Moreover, the electronic devices preparatorily have respective peculiar pieces of identification information, and the management information formed by each of the electronic devices is outputted to the management information display unit in correlation with the identification information. Therefore, the inputted management information can reliably be identified as to which electronic device of the electronic devices pertains to the management information on the management information display unit. Through this identification, it is possible to display the management information together with the name of the electronic device from which the information is outputted and let the user securely recognize the management information as to which electronic device pertains to the management information, allowing reliable and efficient management to be achieved.

According to the second aspect of the present invention, the output of the management information from each of the electronic devices to the management information display unit can be achieved by providing each of the electronic devices individually with the electronic device control section that has the management information forming section for forming the management information according to the power supply state of the installed fuel cell and the information output section that outputs the management information formed for installation in correlation with the identification information to the management information display unit. This makes it possible to perform comprehensive and efficient management of the fuel cells.

According to the third aspect of the present invention, by providing the management information display unit with the information input section for inputting the identification information and the management information outputted from each of the electronic devices, the identification section for identifying the management information as to which electronic device of the electronic devices pertains to the inputted management information on the basis of the inputted identification information, and the display section for displaying the management information while allowing the identification as to which electronic device pertains to the management information, it is possible to let the user securely recognize the management information.

According to the fourth aspect of the present invention, the management information includes at least one piece of information of the residual quantity of fuel storage of the installed fuel cell, the output voltage in supplying the electric power, the temperature or humidity. of the fuel cell and the leakage warning of the fuel. With this arrangement, various sorts of management concerning the fuel cells can concretely be achieved. When the residual quantity of fuel storage is managed, it becomes easy to manage the fueling. Moreover, when the output voltage is managed, changes in the use state and the load condition of the fuel cell in each of the electronic devices can easily be known, and the fault management of each of the fuel cells can be achieved. Moreover, when the temperature or the humidity is displayed, the fault management by heat or water caused by the fuel cell can be facilitated. Furthermore, when the leakage warning of the fuel is managed, it can be made easy to promptly discover the fuel leakage of the fuel cell.

According to the fifth aspect of the present invention, the management information includes at least one piece of information of the fueling frequency of the installed fuel cell, the operating time of the fuel cell from the latest fueling time and the specific fuel consumption of the fuel, and the management information forming section comprises a calculation section for calculating at least one piece of the information. With this arrangement, changes in the use state and the load condition of each of the fuel cells installed in the electronic devices can easily be known by the fueling frequency, the operating time of the fuel cell and the specific fuel consumption, and the fault management of each of the fuel cells can be facilitated.

According to the sixth aspect of the present invention, by preparatorily setting the prescribed value for the information that should be managed in the electronic device control section of each of the electronic devices, forming the management information concerning the information when the information reaches the prescribed value and transmitting the information to the management information display unit, it becomes possible to transmit the management information securely and promptly when the management information is required to be transmitted to the user. In concrete, by transmitting and displaying the information as the management information to the management information display unit when the residual quantity of fuel storage becomes equal to or smaller than a prescribed quantity, it is possible to securely and promptly inform the user of the necessity of fueling and urge the user to fuel. Moreover, by transmitting the information as the management information to the management information display unit and displaying the information when the fluctuation in the output voltage becomes equal to or greater than the prescribed value or when the temperature or humidity becomes equal to or higher than the prescribed value or when the fuel leakage occurs, it is possible to securely and promptly inform the user of the occurrence of the failure or the like of the fuel cell, allowing the fault management to be facilitated.

According to the seventh aspect of the present invention, each of the electronic device control sections is able to output the management information formed in the management information forming section from the information output section while allowing the information to be inputted to the management information display unit on the basis of the request signal that is outputted from the request signal output section provided for the management information display unit and inputted to the request signal input section via the information transmitting part. With this arrangement, the user can perceive the management information by transmitting the request signal when the user desires to perceive the information. Therefore, a fuel cell management system capable of further increasing the degree of freedom of the management operation can be provided.

According to the eighth aspect of the present invention, the electronic device control section forms the management information in the management information forming section on the basis of the power turning-on or turning-off operation of the electronic device and outputs the formed management information from the information output section while allowing the management information to be inputted to the management information display unit. With this arrangement, by the power turning-on operation of the electronic device put in the power-off state, the state of the fuel cell when the electronic device starts being used can be managed, and management capable of securing the subsequent continuous use of the electronic device can be carried out. Moreover, by transmitting the state of the fuel cell when the use of the electronic device is stopped as the management information to the management information display unit by the power turning-off operation of the electronic device put in the power-on state, the management information of the electronic device put in the power-off state can be subsequently displayed as the management information in the state immediately after the turning-off of the power. Therefore, the management can be carried out reliably and efficiently with the electronic device of which the power is turned on and off.

According to the ninth aspect of the present invention, the management information display unit is provided with the stop signal output section that determines whether or not the stop of the operation of the electronic device is required on the basis of the contents of the inputted management information for the electronic device identified based on the identification information and outputs the stop signal for stopping the operation of the electronic device via the information transmitting part when it is determined that the stop is required. With this arrangement, it is possible to carry out management such that the electronic device is securely stopped in, for example, a case where an abnormality that requires the stop occurs or in another case.

According to the tenth aspect of the present invention, the management information display unit is further provided with the management information storage section for retrievably storing the inputted management information. With this arrangement, when the management information is not inputted from the electronic device via the information transmitting part and when, for example, the power of the electronic device is put in the off-state and the transmission of the management information by the information transmitting part cannot be achieved, the management information of the electronic device stored in the storage section can be displayed in place of the management information that should be inputted. With this arrangement, it is possible to let the user recognize the desired management information by displaying the information regardless of the on-state or off-state of the electronic device, and reliable and efficient management can be achieved.

According to the eleventh aspect of the present invention, the information transmitting part is wireless communication. This can obviate the need for considering the wiring for connecting the management information display unit with each of the electronic devices and allows more efficient management to be achieved.

According to the twelfth aspect of the present invention, the identification information is an IP address. With this arrangement, the management can be carried out by connecting a variety of electronic devices with the management information display unit by using, for example, the Internet or the like that uses the IP address as the information transmitting part.

According to the thirteenth aspect of the present invention, the management information display unit is able to output the audio sound correlated with the management information. With this arrangement, the user can be informed of the management information not only visually but also auditorily.

According to the fourteenth aspect of the present invention, the management information display unit displays the where to make contact of the dealer or repairer of the electronic device or the fuel cell together with the management information. With this arrangement, it is possible to immediately make contact with the repairer or the like and achieve prompt management when the abnormality of the fuel leakage or the like occurs at the fuel cell.

According to the fifteenth aspect or the sixteenth aspect of the present invention, the main audio component, which has the function of comprehensively carrying out the reproduction of the audio signal by applying the fuel cell management system of each of the aforementioned aspects to the audio system provided with a plurality of speaker components in which the fuel cells are installed as the plurality of electronic devices and the main audio component that reproduces the audio signal, is provided with the management signal display unit that comprehensively manages the management signal. With this arrangement, the management (control) for the reproduction of the audio signal and the management of the management information can be comprehensively carried out.

Moreover, by using wireless communication as the information transmitting part for such the audio system, it is also possible to carry out the comprehensive management of the fuel cells while allowing the speaker components to be freely arranged and achieve the comprehensive and efficient management of the fuel cells while satisfying the demand of the user.

According to the seventeenth aspect of the present invention, the fuel cell is further provided with the secondary battery, and the residual quantity information of the accumulated electricity of the secondary battery is included as the management information. In the operation control section of the main audio component, on the basis of the residual quantity information of the accumulated electricity of the secondary battery inputted from the electronic device control section via the information transmitting part and the power generation load estimate of the fuel cell based on the audio signal transmitted to the electronic device control section, i.e., the estimate of the power generation load of the fuel cell for supplying the power necessary for generating a sound with the required volume based on the audio signal in the speaker components, the instruction signal for charging the secondary battery with the power generated by the fuel cell can be outputted as the operation control signal to the electronic device control section. With this arrangement, the secondary battery can be charged in accordance with the required timing while accurately supplying the power necessary for outputting the audio output from the speaker components. Therefore, the charging of the secondary battery for supplying the power necessary for transmitting information between the speaker components and the main audio component can reliably be carried out without obstructing the function required for the speaker components.

According to the eighteenth aspect of the present invention, the operation control section of the main audio component can efficiently reduce the communication time for information transmission by transmitting the operation control information together with the audio signal to the speaker components via the information transmitting part. Particularly, when the packet communication system in which the audio signal is transmitted divided into a plurality of packets is adopted, more efficient communications become possible by carrying out the communications with the operation control information inserted between the packets of the audio signals.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
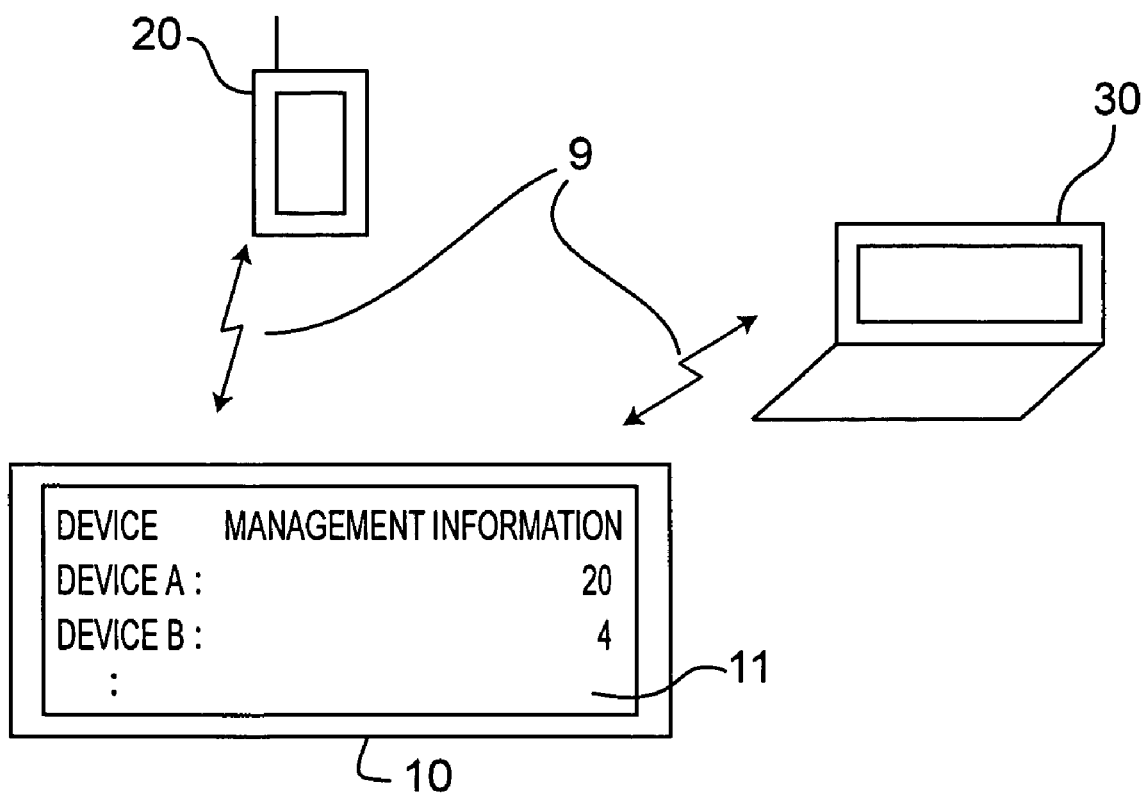
FIG. 1 is a schematic structural view showing the construction of a fuel cell management system according to a first embodiment of the present invention.

Before the description of the present invention proceeds, it is to be noted that like parts are designated by like reference numerals throughout the accompanying drawings.

The first embodiment of the present invention will be described in detail below with reference to the drawings.

First Embodiment

FIG. 1 shows a schematic structural view of a fuel cell management system 101 of one example of the fuel cell management system according to the first embodiment of the present invention.

As shown in FIG. 1, the fuel cell management system 101 is a management system that comprehensively manages the power supply states of fuel cells installed in a portable phone 20 and a notebook type personal computer (hereinafter referred to as a notebook PC) 30, each of which is one example of the electronic device that has an installed fuel cell and operates on a power supplied from the installed fuel cell (or device operating on a fuel cell).

A variety of types of fuel cells can be employed as such the fuel cell. Particularly, as a mobile power source for use in the portable phone 20 and the notebook PC 30, a Polymer Electrolyte Fuel Cell (PEFC), which has an operation environment of a comparatively low temperature (i.e., operation environment close to the normal temperature), is often used. This PEFC type fuel cell employs a polymer membrane that has hydrogen ion conductivity in electrolyte and uses hydrogen, methanol or the like as a fuel. It is to be noted that the fuel cell is not limited only to the case where such the PEFC type fuel cell is used, and it may be a case where fuel cells of a variety of other types are used instead of such the case.

Referring in concrete to the construction of the fuel cell management system 101, as shown in FIG. 1, the fuel cell management system 101 is provided with a management unit 10 that manages the power supply states of the fuel cells installed in the portable phone 20 and the notebook PC 30. The management unit 10, the portable phone 20 and the notebook PC 30 are able to mutually transfer information by a wireless communication part 9 of one example of the information transmitting part. Moreover, the management unit 10 includes a display section 11 for displaying the information while allowing the user to recognize the information. By displaying the information transferred via the wireless communication part 9 in the display section 11 of the management unit 10, the power supply states of the fuel cells installed in the portable phone 20 and the notebook PC 30 can be comprehensively managed. It is to be noted that the construction of the fuel cell management system 101 as described above can also be regarded as the construction of the so-called "client-server type" management system that uses the management unit 10 as a server. In the following description, the portable phone 20 and the notebook PC 30 are assumed to be the electronic devices unless the portable phone 20 and the notebook PC 30 are each used specified. It is noted that the information transmitting part is composed by software or by hardware.

The information to be transferred in such the fuel cell management system 101 is described here. Such the information includes "identification information" and "management information".

First, the "identification information" is peculiar information for identifying one electronic device from among a plurality of electronic devices, in each of which a fuel cell is installed, such as the portable phones 20 and the notebook PC 30. As such the identification information, there can be used, for example, an "IP address", and different IP addresses are allocated to the portable phone 20 and the notebook PC 30 and preparatorily stored respectively in the portable phone 20 and the notebook PC 30. Moreover, the IP addresses of the electronic devices are also preparatorily stored in the management unit 10.

On the other hand, the "management information" is the information for managing the power supply states of the fuel cells installed in the portable phone 20 and the notebook PC 30. As such the management information, there are included the pieces of information of, for example, the residual storage quantity (or the storage quantity) of the fuel of hydrogen, methanol or the like to be put in the fuel cell, an output voltage of power supply from the fuel cell, the fuel cell temperature (e.g., internal temperature and main body temperature of the fuel cell) and humidity (e.g., humidity in an internal space of the electronic device where the fuel cell is installed), fuel leakage warning and so on. That is, the management information is the information for management as to whether or not there is an abnormality in the state of power generation in each of the fuel cells and the state of supply of the generated power to the electronic device or whether or not this power supply state can be continued. It is to be noted that the "power supply state" means the state of supply of power necessary for normally operating the electronic device from the fuel cell and includes the state of each constituent portion necessary for power generation in the fuel cell, the state of power generation, the state of supply of the generated power and so on.

Moreover, such the "management information" is formed in each of the electronic devices in accordance with the power supply state of the installed fuel cell and transmitted and inputted to the management unit 10 via the wireless communication part 9 in correlation with the IP address preparatorily stored in each of the electronic devices. By thus transmitting the management information in correlation with the IP address, it is possible to determine the management information inputted to the management unit 10 via the wireless communication part 9 as to which electronic device of the electronic devices has originated the management information. In the present first embodiment, the management unit 10 is serves as one example of the management information display unit.

The construction of the fuel cell management system 101 having such the system construction will be described more in detail next with reference too the system block diagram of the fuel cell management system 101 shown in FIG. 2.

Figure 2:
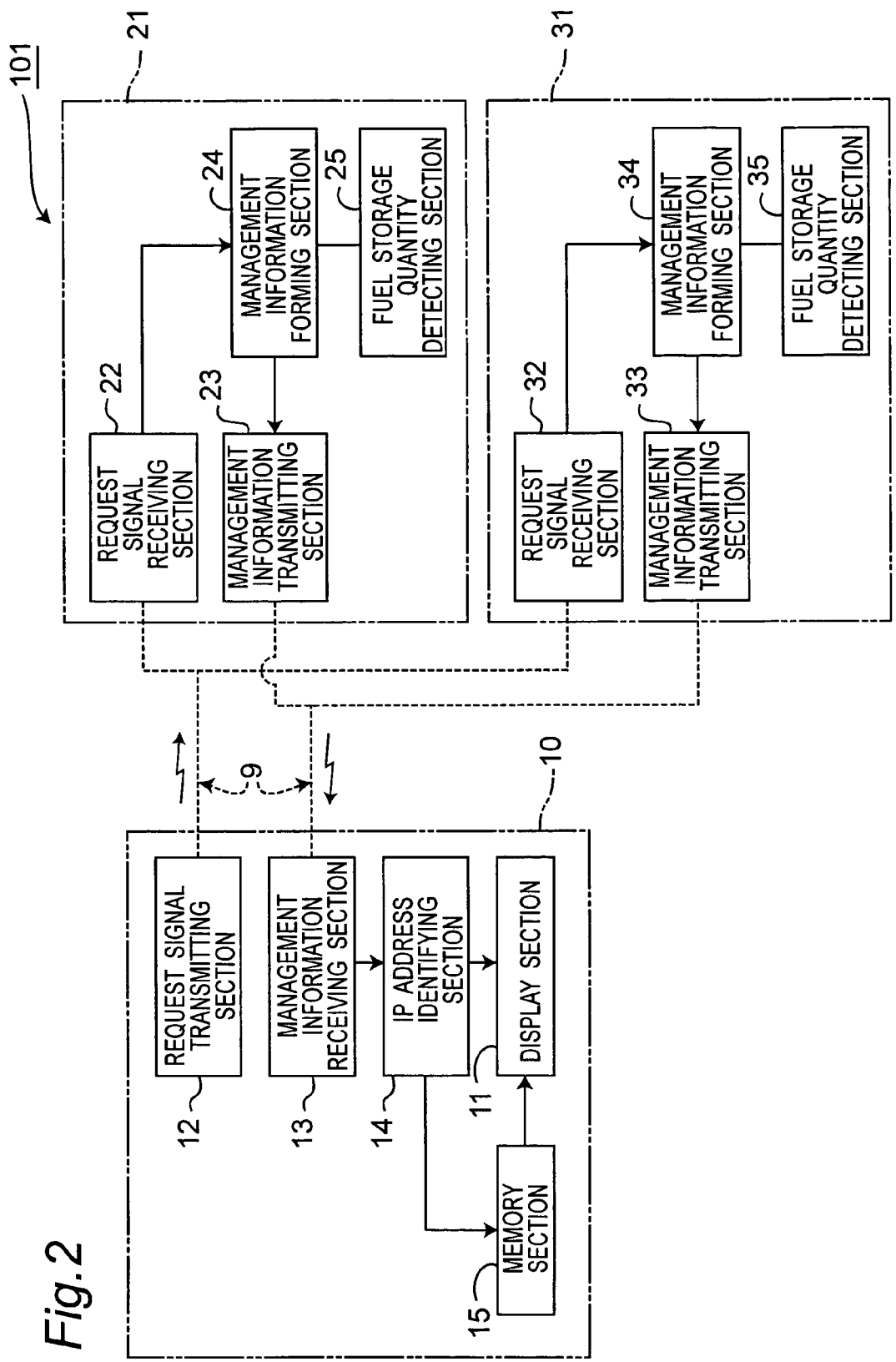
FIG. 2 is a system block diagram of the fuel cell management system of the first embodiment.

As shown in FIG. 2, in the fuel cell management system 101, the management unit 10 includes a management information receiving section 13 of one example of the information input section for receiving (an input of) each pieces of management information transmitted from each of the electronic devices via the wireless communication part 9, an IP address identifying section 14 of one example of the identifying section for identifying the management information as to which electronic device of the electronic devices pertains to the management information on the basis of the IP address correlated with the received management information, a memory section 15 of one example of the storage section for retrievably storing the IP address and the management information of each of the electronic devices and a display section 11 for displaying the management information while allowing the management information to be identified as to which electronic device pertains to the management information.

Moreover, as shown in FIG. 2, the portable phone 20 is provided with a device side control section 21 of one example of the electronic device control section for forming the management information of the installed fuel cell, and the notebook PC 30 is similarly provided with a device side control section 31 of one example of the electronic device control section. These device side control sections 21 and 31 are provided in the respective control sections for executing the operation control of the portable phone 20 and the notebook PC 30.

The device side control section 21 in the portable phone 20 includes a management information forming section 24 for forming management information in accordance with the power supply state of the installed fuel cell, a detection section for detecting information for forming the management information in the management information forming section 24 and is exemplified by a fuel storage quantity detecting section 25 for detecting the residual quantity of fuel storage stored in the fuel cell, and a management information transmitting section 23 of one example of the information output section for correlating the management information formed in the management information forming section 24 with an IP address and transmitting the information to the management unit 10 via the wireless communication part 9. The information of the residual quantity of fuel storage detected by the fuel storage quantity detecting section 25 is inputted to the management information forming section 24, and the management information of the residual quantity of fuel storage can be formed on the basis of the information in the management information forming section 24.

Moreover, as shown in FIG. 2, the device side control section 31 of the notebook PC 30 has a construction similar to that of the device side control section 21 of the portable phone 20. The device side control section 31 includes a management information forming section 34, a fuel storage quantity detecting section 35 and a management information transmitting section 33.

Further, as shown in FIG. 2, the management unit 10 includes a request signal transmitting section 12 for transmitting a request signal for requesting the formation and transmission of management information to each of the electronic devices via the wireless communication part 9. In correspondence with this, the device side control section 21 includes a request signal receiving section 22 for receiving the transmitted request signal, and the device side control section 31 includes a request signal receiving section 32. The management information is formed in the management information forming section 24 by transmitting the request signal from the request signal transmitting section 12 and making, for example, the request signal receiving section 22 receive the request signal, and the formed management information can be transmitted by the management information transmitting section 23.

A processing procedure of management operation for managing the power supply states of the fuel cells installed in the electronic devices in the fuel cell management system 101 that has the aforementioned system construction will be described in concrete below.

Figure 3:
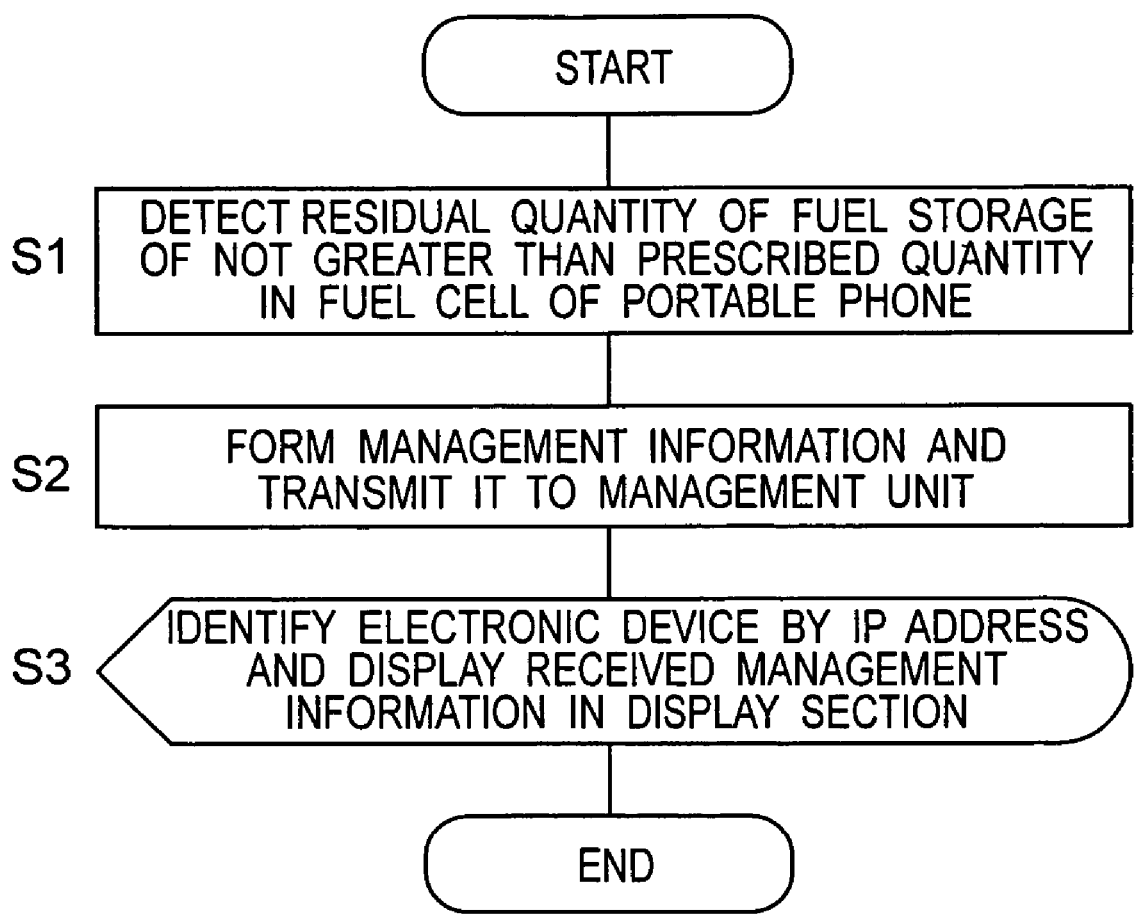
FIG. 3 is a flow chart showing a processing procedure of management operation when the residual quantity of fuel storage becomes equal to or lower than a prescribed value in the fuel cell management system of the first embodiment.

The flow chart shown in FIG. 3 is the processing procedure of the management operation carried out when the residual quantity of fuel storage of the installed fuel cell becomes equal to or lower than the prescribed storage quantity in any electronic device of the electronic devices.

In step S1 in the flow chart shown in FIG. 3, the fuel storage quantity detecting section 25 of the device side control section 21 detects that the residual quantity of fuel storage of the fuel cell installed in the portable phone 20 of the electronic devices has been reduced and become equal to or lower than the prescribed quantity. Upon this detection, management information concerning the residual quantity of fuel storage is formed in the management information forming section 24.

Subsequently, in step S2, the management information transmitting section 23 transmits the management information to the management unit 10 via the wireless communication part 9 in a state in which the information is correlated with an IP address, and the management information receiving section 13 of the management unit 10 receives the management information.

Subsequently, in step S3, the management information received by the management unit 10 is inputted to the IP address identifying section 14 to identify that the electronic device name is the "portable phone 20" of the electronic devices on the basis of the correlated IP address, and the residual quantity of fuel storage of the management information is displayed in the display section 11 with the electronic device name of the "portable phone 20". It is to be noted that the display of the residual quantity of fuel storage is displayed in a blinking manner in order to call the user's attention in the display section 11.

By thus displaying the electronic device name and the residual quantity of fuel storage in the display section 11 of the management unit 10, the user, who has visually recognized this display, can replenish the fuel cell installed in the portable phone 20 with a fuel, by which the problem that the power supply fails as a consequence of the fuel rundown of the fuel cell unexpectedly occurring in the portable phone 20 can be avoided.

A fuel cell is, for example, detachably installed in each of the electronic devices, and in fueling the installed fuel cell, the fueling can be carried out with the fuel cell detached from the main body of the electronic device. Moreover, as a form of concrete fueling, the fueling can be achieved by, for example, connecting a fuel cartridge filled with the fuel for replenishment to a fuel supply port of the fuel cell.

Figure 4:
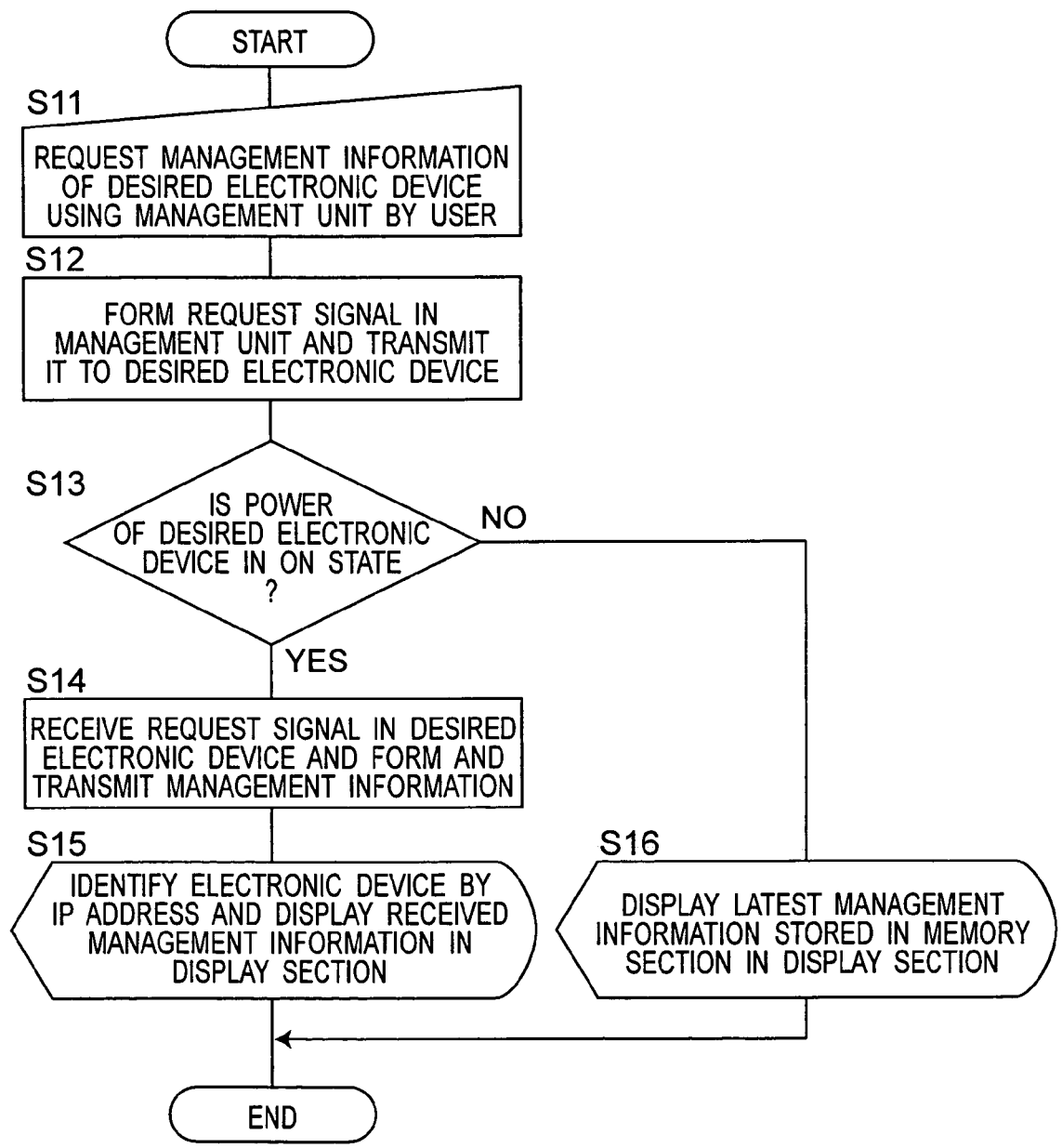
FIG. 4 is a flow chart showing a processing procedure of management operation when the user requests management information in the fuel cell management system of the first embodiment.

Next, FIG. 4 shows a flow chart showing a processing procedure when the management operation is executed by the user using the management unit 10 and transmitting a request signal for requesting the transmission of the management information to any one of the electronic devices.

In step S11 of the flow chart in FIG. 4, the user, who is the user of each electronic device, requests the transmission of the management information to the desired electronic device of which the management information is desired to be checked or, for example, the notebook PC 30 by using the management unit 10. This request operation by the user can be executed by using an input means (not shown) provided for the management unit 10 or, for example, a keyboard or the like. In concrete, the request operation is carried out by designating the destination of a request for outputting the management information, the destination being an electronic device selected from the electronic devices.

Subsequently, in step S12, the request signal for requesting the transmission of the management information is formed in the management unit 10 in accordance with the request operation executed by the user. The formed request signal is correlated with an IP address for identifying the electronic device, and the request signal is outputted from the request signal transmitting section 12. As a result, the request signal is transmitted to the notebook PC 30 via the wireless communication part 9. It is to be noted that this request signal transmission is achieved by identifying the notebook PC 30 by using the IP address correlated with the request signal.

Next, it is determined in step S13 whether or not the power of the notebook PC 30 that is the electronic device to which the transmission of the management information is requested is in the on-state.

When the power is on, the transmitted request signal is received by the request signal receiving section 32 in the device side control section 31 of the notebook PC 30 in step S14. Upon receiving this request signal, the residual quantity of fuel storage of the fuel cell is detected by the fuel storage quantity detecting section 35, and the management information concerning the residual quantity of fuel storage is formed in the management information forming section 34 on the basis of the result of detection. The formed management information is correlated with the IP address of the notebook PC 30 in the management information transmitting section 33 and transmitted to the management unit 10 via the wireless communication part 9.

Subsequently, in step S15, the management information is received by the management information receiving section 13 of the management unit 10, and the electronic device name of "notebook PC 30" is identified by the IP address identifying section 14 on the basis of the IP address. Consequently, the residual quantity of fuel storage of the management information is displayed together with the electronic device name in the display section 11.

When the power of the notebook PC 30 is not turned on in step S13, the request signal transmitted from the management unit 10 is not received by the notebook PC 30. Therefore, the operation of forming the management information in the notebook PC 30 and transmitting the same cannot be executed.

Therefore, in such the case, in step S16, the latest management information stored in the memory section 15 of the management unit 10 is retrieved, and this management information is displayed together with the electronic device name in the display section 11. At this time, the fact that the notebook PC 30 is in the power-off state may be concurrently displayed in the display section 11.

According to the processing procedure of such the management operation, by forming and transmitting the management information from the desired electronic device of the electronic devices in accordance with the desired timing upon the request by the user and letting the user visually recognize the management information displayed in the display section 11, the residual quantity of fuel storage of the fuel cell installed in the notebook PC 30 can be managed. Therefore, the user can freely set the electronic device that is desired to be managed and the timing, and therefore, the degree of freedom in the management procedure is increased to allow efficient management to be carried out.

Although the case where the IP address has been used as the identification information in the description of the aforementioned first embodiment, it may be a case where other identification information is used instead of the case where the IP address is used as described above.

Moreover, although the case where the fuel cell management system 101 is constructed of one management unit 10 and two electronic devices in which the fuel cells are installed has been described according to the above description, the present first embodiment is not limited only to such the case. For example, it may be a case where the fuel cell management system is constructed of a plurality of management units and three or more electronic devices.

Moreover, the information transmitting part for transmitting information between the management unit 10 and each of the electronic devices is the wireless communication part 9 according to the above description. However, instead of such the case, it may be a case where the information transmitting part is a wired communication part or a composite communication part constructed of wired and wireless communication part of, for example, communication part like the Internet. When the wireless communication part 9 is adopted, there is an advantage that the management of the fuel cells can be carried out without being influenced by the arrangement of the electronic devices, and the degree of freedom and portable mobility of the electronic devices can be improved.

According to the first embodiment, the following various effects can be obtained.

First of all, the fuel cell management system 101 includes the management unit 10, which is able to output the management information, or the information for managing the power supply state of the installed fuel cell in each of the electronic devices in which the fuel cells are installed and able to receive the outputted management information besides the aforementioned electronic devices, and the management information can be displayed in the display section 11 by the management unit 10. With this arrangement, the fuel cells of the electronic devices can be comprehensively managed by the management unit 10 without being individually managed in each of the electronic devices.

Moreover, the peculiar IP addresses are preparatorily allocated to the electronic devices, and the management information formed in each of the electronic devices is outputted to the management unit 10 in correlation with the allocated peculiar IP address. Therefore, the IP address identifying section 14 of the management unit 10 can securely identify the management information as to which electronic device of the electronic devices has transmitted the management information. Moreover, by displaying the identified management information together with the electronic device name in the display section 11, the user can be informed of the electronic device to which the management information pertains, allowing reliable and efficient management to be achieved.

Moreover, the management unit 10 includes the request signal transmitting section 12 that transmits the request signal for requesting the formation and transmission of management information. The device side control section 21 of the portable phone 20 includes the request signal receiving section 22 that receives the request signal transmitted from this request signal transmitting section 12 via the wireless communication part 9. The device side control section 31 of the notebook PC 30 includes the request signal receiving section 32. With this arrangement, it is possible to transmit the request signal to the desired electronic device in accordance with the desired timing in response to the request by the user, form the management information in the electronic device that has received the request signal and transmit the management information to the management unit 10. Therefore, the degree of freedom in the management operation of the fuel cells can be increased, and more efficient management can be carried out.

Second Embodiment

Figure 5:
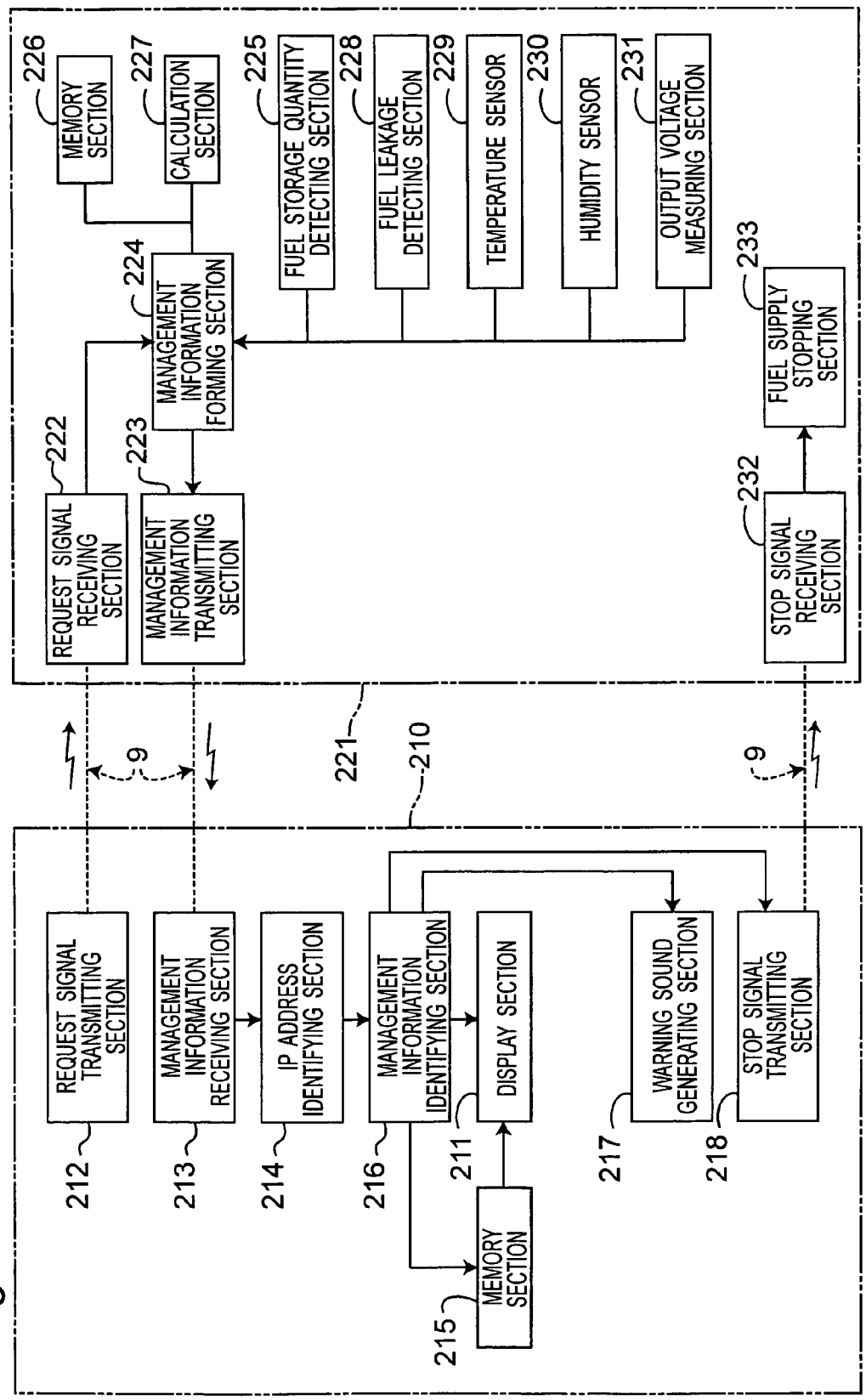
FIG. 5 is a system block diagram of a fuel cell management system according to a second embodiment of the present invention.

The present invention is not limited to the aforementioned embodiment but allowed to put into practice in a variety of forms. For example, a fuel cell management system 201 according to the second embodiment of the present invention differs from the fuel cell management system of the first embodiment in that it can manage the pieces of information of the output voltage of power supply from the fuel cell, fueling frequency, operating time of the electronic device from the latest fueling time to the present time, fuel consumption, temperature abnormality, humidity abnormality, and fuel leakage warning in addition to the residual storage quantity of the fuel as the management information, and the operation of an electronic device can be stopped by transmitting a stop signal from the management unit to the electronic device according to the contents of the management information. The system construction of this fuel cell management system 201 is shown in FIG. 5, and the detailed construction of the fuel cell management system 201 will be described below with reference to FIG. 5. It is to be noted that FIG. 5 shows only one management unit and one electronic device of a plurality of electronic devices in order to facilitate the understanding of the construction of the fuel cell management system 201.

As shown in FIG. 5, the fuel cell management system 201 is provided with a plurality of electronic devices in which a management unit 210 and a fuel cell are installed, and a device side control section 221 of one example of the electronic device control section provided for one electronic device of these electronic devices is shown in FIG. 5.

Moreover, as shown in FIG. 5, the management unit 210 has a construction approximately similar to that of the management unit 10 of the first embodiment and includes a request signal transmitting section 212, a management information receiving section 213, an IP address identifying section 214, a memory section 215 and a display section 211. Moreover, dissimilarly to the fuel cell management system 101 of the first embodiment, the fuel cell management system 201, which handles a plurality of kinds of management information, therefore includes a management information identifying section 216 for identifying the kinds of these pieces of management information. This management information identifying section 216 can identify the kind of the management information identified by the IP address identifying section 214 as to which kind the management information is.

Moreover, the device side control section 221 has a construction approximately similar to that of the device side control section 21 of the first embodiment and includes a request signal receiving section 222, a management information transmitting section 223, a management information forming section 224 and a fuel storage quantity detecting section 225. The device side control section 221 further includes a fuel leakage detecting section 228 of one example of the detection section for detecting the fuel leakage of the fuel cell, a temperature sensor 229 of one example of the detection section for detecting the temperature of the fuel cell, a humidity sensor 230 of one example of the detection section for detecting humidity and an output voltage measuring section 231 of one example of the detection section for measuring the output voltage. The information detected in each of the detection sections is inputted to the management information forming section 224, and the pertinent management information can be formed in the management information forming section 224.

Moreover, the management information forming section 224 in the device side control section 221 is provided with a memory section 226 of one example of the storage section for retrievably storing the information and so on inputted from each of the detection sections and a calculating section 227 of one example of the calculating section for forming management information by carrying out prescribed calculation using the information stored in the memory section 226 and the information inputted to the management information forming section 224. For example, the memory section 226 is able to retrievably store the fueling frequency of the liquid fuel, the operating time of the electronic device from the latest fueling time to the present time and so on. The management information forming section 224 is able to retrieve these pieces of information and form management information while allowing the information to be transmitted. The calculating section 227 is able to retrieve the information of the operating time of the electronic device stored in the memory section 226 and calculate the specific fuel consumption of the power generation (power supply) of the fuel cell on the basis of the information of the residual quantity of fuel storage inputted from the fuel storage quantity detecting section 225 for the formation of management information.

Further, as shown in FIG. 5, the management unit 210 includes a stop signal transmitting section 218 for forming a stop signal for requesting the stop of the operation of an electronic device according to the contents of the management information transmitted from the device side control section 221 and transmitting the stop signal to the device side control section 221. In correspondence with this, the device side control section 221 includes a stop signal receiving section 232 for receiving the stop signal transmitted from the management unit 210 via the wireless communication part 9 and a fuel supply stopping section 233 for stopping the operation of the electronic device by stopping the supply of the fuel to the fuel cell installed in the electronic device upon receiving the stop signal to the stop signal receiving section 232.

In concrete, when the reception of the management information concerning the temperature abnormality, humidity abnormality and fuel leakage warning from the device side control section 221 is identified by the management information identifying section 216 of the management unit 210, the stop signal is transmitted from the stop signal transmitting section 218 to the electronic device identified by the IP address.

Moreover, the management unit 210 includes a warning sound generating section 217 for generating a sound of buzzer sound or the like as a warning sound in order to call the user's attention in accordance with the transmission of this stop signal. Further, it is possible to display where to make contact of the dealer or the repairer of the electronic device or the fuel cell in the display section 211 concurrently with the generation of this warning sound.

Moreover, the management information of the management unit 210 is transmitted from the device side control section 221 in accordance with a timing when the request signal for requesting the transmission of the management information is transmitted from the request signal transmitting section 212 of the management unit 210 to the request signal receiving section 222 of the device side control section 221. Further, pertinent management information is transmitted when the residual quantity of fuel storage detected in the fuel storage quantity detecting section 225 becomes equal to or lower than a prescribed quantity, when fuel leakage is detected in the fuel leakage detecting section 228, when the temperature detected by the temperature sensor 229 becomes equal to or higher than a prescribed temperature, when the humidity detected by the humidity sensor 230 becomes equal to or higher than a prescribed humidity, or when the fluctuation range of the output voltage measured in the output voltage measuring section 231 becomes equal to or greater than a prescribed value. It is to be noted that the information of the prescribed values are preparatorily inputted in the memory section 226 or the like.

One example of the processing procedure of management operation in the fuel cell management system 201 that has the aforementioned construction will be described below with reference to flow charts.

Figure 6:
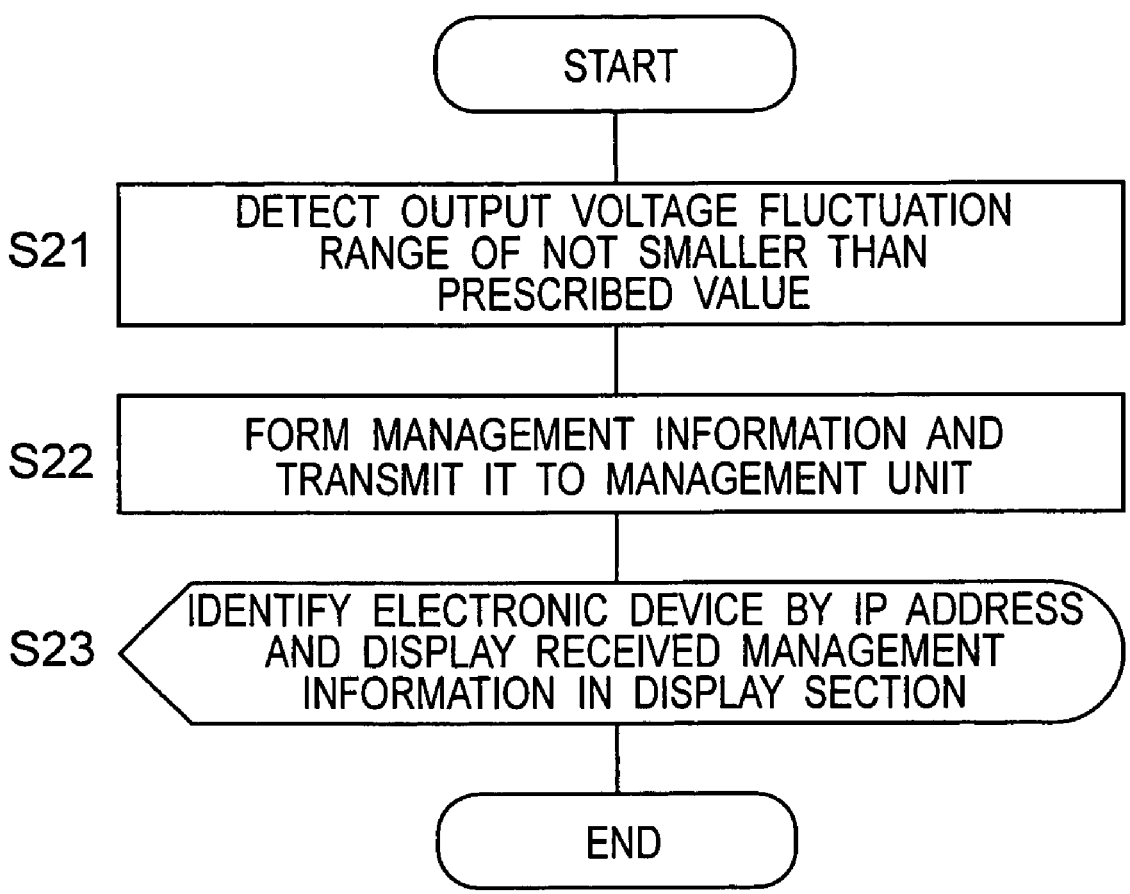
FIG. 6 is a flow chart showing a processing procedure of management operation when an output voltage fluctuation range of not smaller than a prescribed value is detected in the fuel cell management system of the second embodiment.

First of all, the flow chart shown in FIG. 6 shows the processing procedure when the fluctuation range of the output voltage becomes equal to or greater than the prescribed value in the fuel cell installed in an electronic device.

In step S21 of the flow chart of FIG. 6, an output voltage fluctuation range of not smaller than the prescribed value is detected by the output voltage measuring section 213 in one electronic device of the electronic devices provided in the fuel cell management system 201. This detection can be achieved by, for example, comparing the information of the prescribed value of the fluctuation range of the output voltage preparatorily stored in the memory section 226 with the information of the fluctuation range actually measured in the output voltage measuring section 231 in the calculating section 227.

Next, in step S22, management information concerning the fluctuation range of the output voltage is formed in the management information forming section 224 upon receiving this detection, and the formed management information is transmitted in correlation with an IP address to the management unit 210 via the management information transmitting section 223 and the wireless communication part 9.

Subsequently, in step S23, the electronic device name is identified on the basis of the IP address in the IP address identifying section 214, and the kind of the management information is identified as the information of the fluctuation range of the output voltage in the management information identifying section 216, so that the electronic device name and the management information are displayed in the display section 211.

With this display in the display section 211, the user can recognize the abnormality in the fluctuation range of the output voltage and the name of the electronic device in which the abnormality has occurred and take appropriate measures of maintenance or the like. Such the maintenance can be carried out by detaching the fuel cell installed in the electronic device from the electronic device, and it is also possible to replace this detached fuel cell with a new fuel cell and install the fuel cell in the electronic device. It is to be noted that the management information is stored in the memory section 215 concurrently with the display of this management information in the display section 211.

Figure 7:
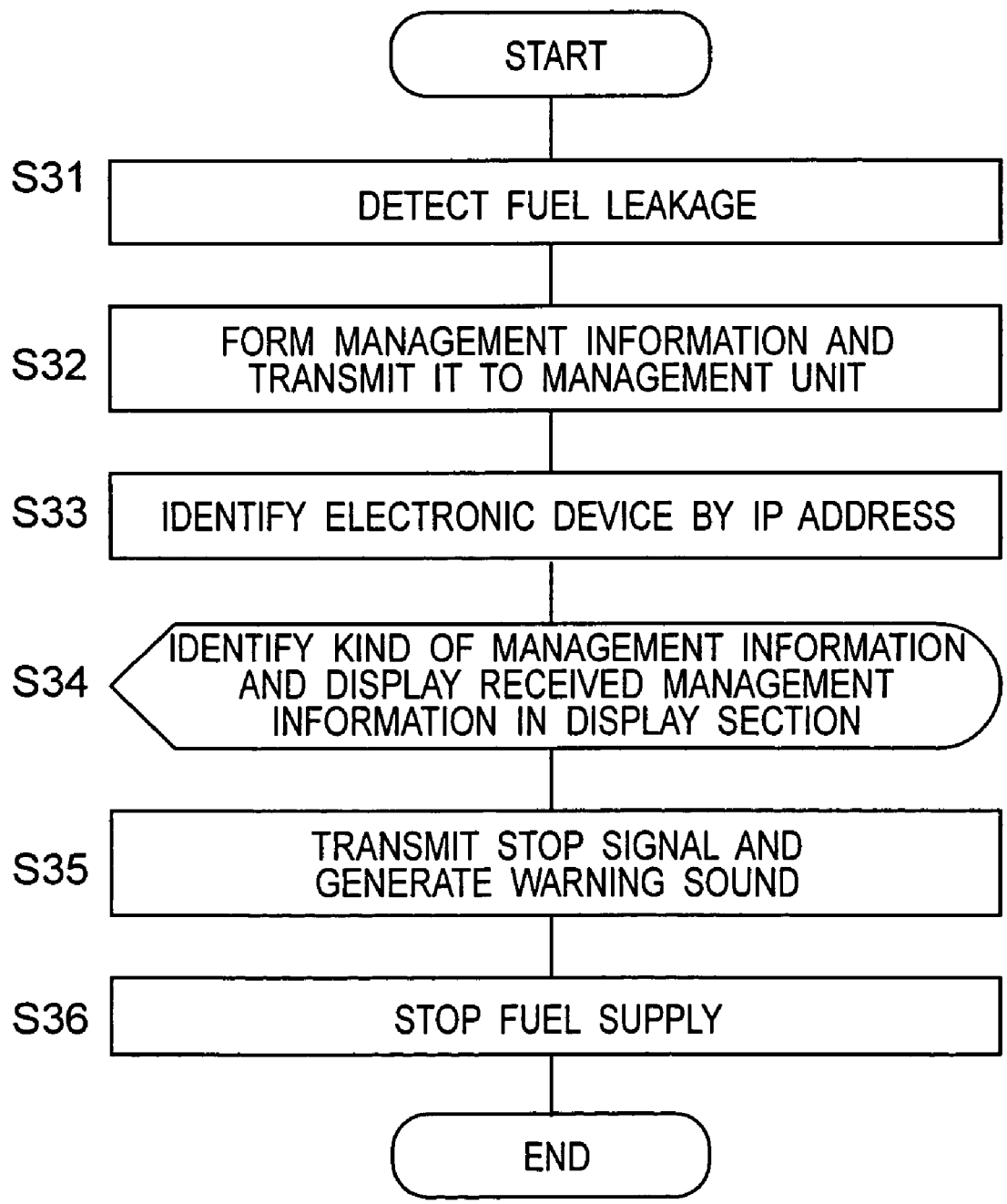
FIG. 7 is a flow chart showing a processing procedure of management operation when fuel leakage is detected in the fuel cell management system of the second embodiment.

Next, the flow chart shown in FIG. 7 shows a processing procedure of management operation in the case where fuel leakage has occurred in the fuel cell installed in an electronic device.

In step S31 in the flow chart of FIG. 7, the fuel leakage of the fuel cell installed in one electronic device of the electronic devices provided in the fuel cell management system 201 is detected by the fuel leakage detecting section 228.

Next, in step S32, upon the detection, management information concerning the fuel leakage is formed in the management information forming section 224, and the formed management information is transmitted in correlation with an IP address to the management unit 210 via the management information transmitting section 223 and the wireless communication part 9.

Subsequently, in step S33, the electronic device name is identified on the basis of the IP address in the IP address identifying section 214. Further, in step S34, the management information is subsequently identified as the one related to the fuel leakage warning in the management information identifying section 216, and the management information is displayed together with the electronic device name in the display section 211. During this display, the display is blinking in order to call the user's attention.

Subsequently, in step S35, a warning sound is generated in the warning sound generating section 217. Concurrently with it, the stop signal is transmitted from the stop signal transmitting section 218 to the stop signal receiving section 232 via the wireless communication part 9.

If the stop signal is received by the stop signal receiving section 232, then the fuel supply to the fuel cell where the fuel leakage has been detected is stopped by the fuel supply stopping section 233 in step S36.

By the above operation, the user can promptly recognize the occurrence of fuel leakage in the one electronic device by the display in the display section 211 and the generation of the warning sound by the warning sound generating section 217. Moreover, since the fuel supply in the electronic device where the fuel leakage is occurring is stopped concurrently with it, the possibility of the occurrence of a more serious problem due to the fuel leakage can be prevented in advance.

According to the second embodiment, various pieces of management information of the fuel cell to be managed can be comprehensively and securely managed by the management unit 210. Moreover, even when such various pieces of management information are handled, it is possible to securely identify the kind of the management information and carry out proper management by virtue of the provision of the management information identifying section 216 in the management unit 210. In concrete, by generating the warning sound in the warning sound generating section 217 together with the display in the display section 211 with regard to the management information of a kind that the user is required to recognize, it becomes possible to call the user's attention for the achievement of prompt recognition.

Moreover, with regard to the management information of a kind that the power generation of the fuel cell is required to be urgently stopped, it is possible to stop the operation of the fuel cell by further transmitting the stop signal for stopping the operation of the fuel cell from the stop signal transmitting section 218 and stopping the fuel supply by the fuel supply stopping section 233 and efficiently carry out management in consideration of sufficiently safety.

Third Embodiment

Figure 8:
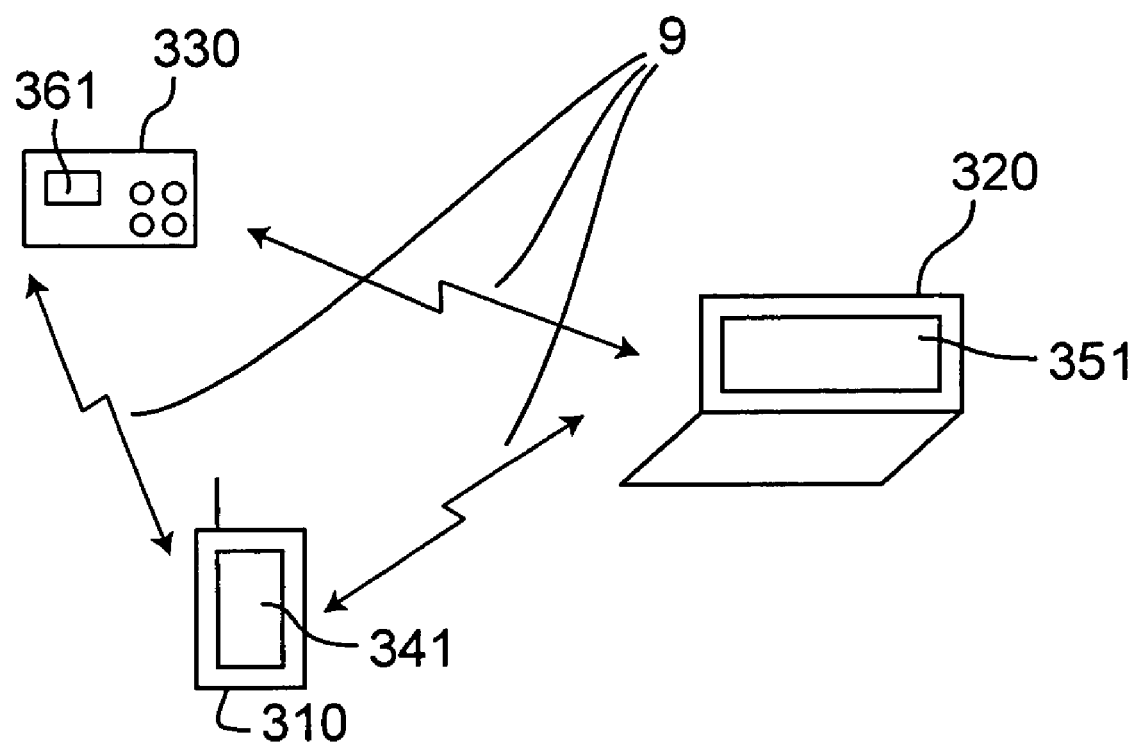
FIG. 8 is a schematic structural view showing the construction of a fuel cell management system according to a third embodiment of the present invention.

Next, FIG. 8 shows the schematic structural view of a fuel cell management system 301 according to the third embodiment of the present invention. As shown in FIG. 8, the fuel cell management system 301 is the so-called "peer-to-peer type" fuel cell management system that is provided with the function of a management unit such that a plurality of electronic devices in each of which the fuel cell is installed mutually manage the management information of the other electronic devices, making it possible to manage the power supply states of the fuel cells installed in the other electronic devices in each of the electronic devices.

In concrete, as shown in FIG. 8, the fuel cell management system 301 is provided with a portable phone 310 of one example of the electronic device in which a fuel cell is installed, a notebook PC 320 of one example of the electronic device, a personal digital assistance (PDA) 330 of one example of the electronic device and a wireless communication part 9 of one example of the information transmitting part for mutually transmitting information between the electronic devices. The portable phone 310 is further provided with a display section 341 for displaying management information and so on. Likewise, the notebook PC 320 is provided with a display section 351, while the PDA 330 is provided with a display section 361.

Figure 9:
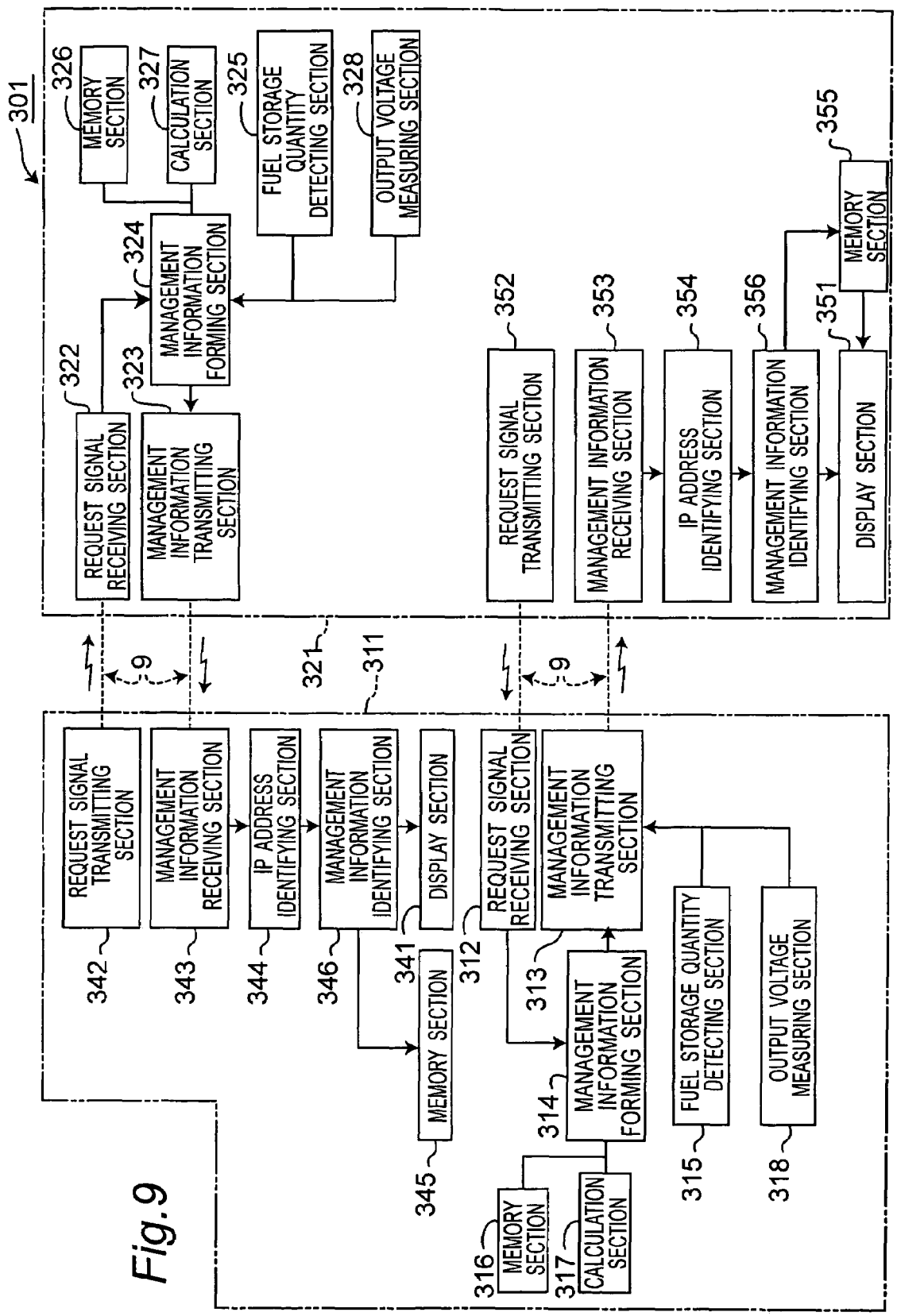
FIG. 9 is a system block diagram of the fuel cell management system of the third embodiment.

A system block diagram showing the system construction of the fuel cell management system 301 that has such the schematic construction is shown in FIG. 9. For the sake of easy understanding of the explanation of the system construction in FIG. 9, only the portable phone 310 and the notebook PC 320 are shown as the representatives of the electronic devices provided in the fuel cell management system 301.

As shown in FIG. 9, the portable phone 310 is provided with a control section 311 of one example of the electronic device control section for carrying out the formation of the management information of the installed fuel cell and so on, while the notebook PC 320 is similarly provided with a control section 321 of one example of the electronic device control section.

The control section 311 of the portable phone 310 includes a request signal receiving section 312, a management information transmitting section 313, a management information forming section 314, a memory section 316, a calculating section 317, a fuel storage quantity detecting section 315 and an output voltage measuring section 318. The control section 321 of the notebook PC 320 includes a request signal receiving section 322, a management information transmitting section 323, a management information forming section 324, a memory section 326, a calculating section 327, a fuel storage quantity detecting section 325 and an output voltage measuring section 328. It is to be noted that the functions of these sections are similar to the functions of the sections of the same names provided in the electronic device of the first embodiment or the second embodiment.

Further, the control section 311 of the portable phone 310 includes a request signal transmitting section 342, a management information receiving section 343, an IP address identifying section 344, a management information identifying section 346, a memory section 345 and a display section 341. The control section 321 of the notebook PC 320 includes a request signal transmitting section 352, a management information receiving section 353, an IP address identifying section 354, a management information identifying section 356, a memory section 355 and a display section 351. The functions of these sections are similar to the functions of the sections of the same names provided in the management unit 10 of the first embodiment or the functions of the sections of the same names provided in the management unit 210 of the second embodiment.

With the fuel cell management system 301 having the aforementioned construction, when the user who has the portable phone 310 desires to manage the power supply state of the fuel cell in the notebook PC 320, management information can be formed in the management information forming section 324 by transmitting the request signal from the request signal transmitting section 342 in the control section 311 of the portable phone 310 to the control section 321 of the notebook PC 320 via the wireless communication part 9 and receiving the request signal in the request signal receiving section 322 of the control section 321. The formed management information is correlated with an IP address and inputted to the management information receiving section 343 in the control section 311 of the portable phone 310 via the management information transmitting section 323 and the wireless communication part 9. The inputted management information has its electronic device name identified on the basis of the IP address in the IP address identifying section 346, and the kind of the management information is identified in the management information identifying section 346 and displayed in the display section 341. The user who has the portable phone 310 can manage the power supply state of the fuel cell installed in the notebook PC 320 according to the display.

Moreover, the user who has the notebook PC 320 can manage the power supply state of the fuel cell installed in the portable phone 310 by reversing the portable phone 310 with the notebook PC 320 regarding such the management operation.

The fuel cell management system 301 is constructed of the three electronic devices according to the above description. However, the fuel cell management system 301 of the present third embodiment is not limited only to such the case, and it is acceptable to constitute a fuel cell management system of two electronic devices or four or more electronic devices.

According to the third embodiment, by providing each of the electronic devices with the function of the management unit instead of providing the management unit 10 or 210 besides the electronic devices as in the management systems of the first embodiment and the second embodiment in managing the fuel cell installed in each of the plurality of electronic devices, one electronic device can manage the fuel cells of the other electronic devices. Therefore, efficient management can be achieved so that the number of devices necessary for the fuel cell management system 301 can be reduced and the fuel cells of the other electronic devices can be managed by any one of the electronic devices.

Fourth Embodiment

Figure 10:
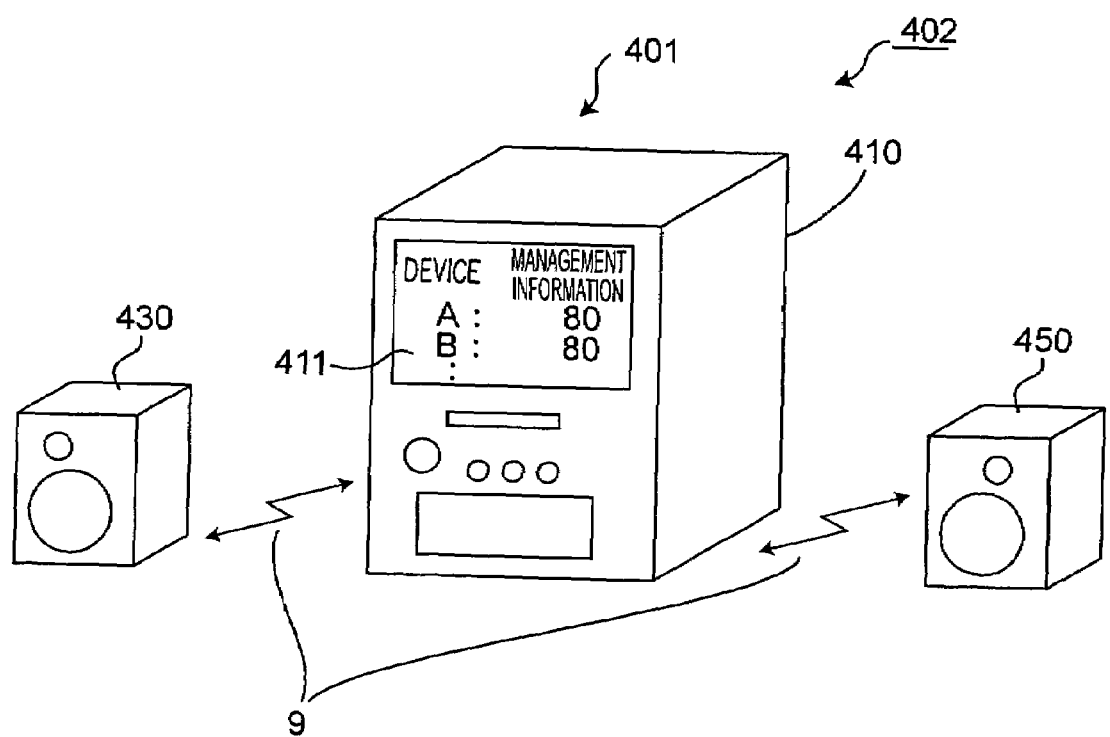
FIG. 10 is a schematic structural view showing the construction of a fuel cell management system according to a fourth embodiment of the present invention.

Next, FIG. 10 shows the schematic structural view of a fuel cell management system 401 according to the fourth embodiment of the present invention.

As shown in FIG. 10, the fuel cell management system 401 of the fourth embodiment is a fuel cell management system applied to an audio system 402 constructed of a main audio component (an audio control component) 410 and speaker components 430 and 450. The main audio component 410 is able to reproduce music information recorded on a recording medium such as an optical disc and transmit the music information as an audio signal to each of the speaker components 430 and 450 via a wireless communication part 9 of one example of the information transmitting part. Moreover, each of the speaker components 430 and 450 serves as one example of the electronic device and has a fuel cell installed as a power source. With this arrangement, the audio signal transmitted from the main audio component 410 can be received by each of the speaker components 430 and 450 via the wireless communication part 9, and the received audio signal can be reproduced allowing the appreciation thereof by the user. With the audio system 402 constructed as above, the user can appreciate music by freely arranging each of the speaker components 430 and 450. It is to be noted that the main audio component 410 is able to control the playback and the stop of playback of the recording medium and adjust the volume and so on of the audio signal to be reproduced.

As shown in FIG. 10, the main audio component 410 is provided with a display section 411 for receiving the management information, which is the information for managing the power supply states of the fuel cells, from each of the speaker components 430 and 450 and displaying the information while allowing the user to visually recognize it. That is, the main audio component 410 concurrently functions as the management information display unit in this fourth embodiment.

Figure 11:
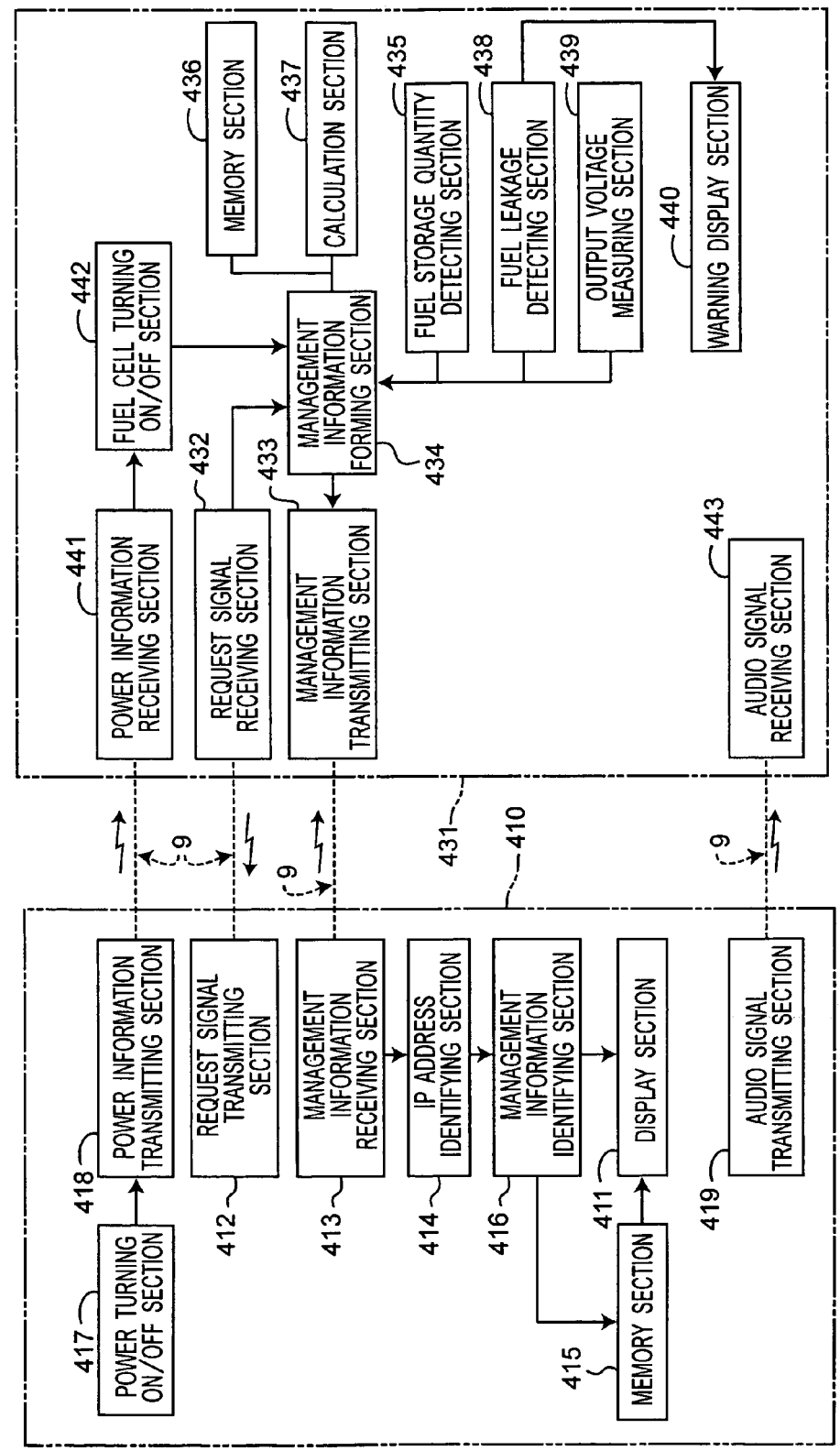
FIG. 11 is a system block diagram of the fuel cell management system of the fourth embodiment.

A system block diagram showing the system construction of the fuel cell management system 401 provided for the audio system 402 that has such the schematic construction is shown in FIG. 11. For the sake of easy understanding of the system construction in FIG. 11, only one speaker component 430 of the speaker components 430 of 450 provided for the audio system 402 is shown as a representative.

As shown in FIG. 11, the main audio component 410 of the fuel cell management system 401 includes a request signal transmitting section 412, a management information receiving section 413, an IP address identifying section 414, a management information identifying section 416, a memory section 415 and a display section 411. The speaker component 430 is provided with a control section 431, and the control section 431 includes a request signal receiving section 432, a management information transmitting section 433, a management information forming section 434, a memory section 436, a calculating section 437, a fuel storage quantity detecting section 435, a fuel leakage detecting section 438 and an output voltage measuring section 439.

The main audio component 410 further includes an audio signal transmitting section 419 for transmitting the audio signal reproduced from the recording medium to each of the speaker components 430 and 450, and the speaker component 430 further includes an audio signal receiving section 443 for receiving this audio signal via the wireless communication part 9. The audio signal transmitting section 419 and the audio signal receiving section 443 are thus provided and allowed to transmit the audio signal between each other via the wireless communication part 9, so that the audio signal can be reproduced at each of the speaker components 430 and 450.

Moreover, as shown in FIG. 11, the main audio component 410 further includes a power turning on/off section 417 that is a power switch for turning on and off the power of the main audio component 410 and a power information transmitting section 418 that is connected to this power turning on/off section 417 and transmits the power information, which is the information of turning on or off the power, to each of the speaker components 430 and 450. On the other hand, the control section 431 of the speaker component 430 includes a power information receiving section 441 for receiving the power information via the wireless communication part 9 and a fuel cell turning on/off section 442, which is an operation switch for turning on or off the operation of the installed fuel cell on the basis of the power information received by this power information receiving section 441. The fuel leakage detecting section 438 is connected to a warning display section 440 and able to display warning in the warning display section 440 in the control section 431 of the speaker component 430 when fuel leakage is detected.

In the fuel cell management system 401 having such the construction, a processing procedure of management operation similar to that of the fuel cell management system 101 of the first embodiment or the fuel cell management system 201 of the second embodiment can be basically carried out. In concrete, management can be carried out by the user by displaying the pieces of information of the residual quantity of fuel storage, fuel leakage alarm, temperature abnormality, humidity abnormality, the fluctuation range of the output voltage, specific fuel consumption, fueling frequency, speaker component operating time and so on as the management information in the display section 411 of the main audio component 410.

In addition, the following operation can also be carried out. For example, if the power of the main audio component 410 is turned on by the power turning on/off section 417, then power information is transmitted from the power information transmitting section 418 to each of the speaker components 430 and 450 via the wireless communication part 9. Upon receiving the power source signal in the power source signal receiving section 441, the control section 431 of the speaker component 430 turns on the operation of the fuel cell by the fuel cell turning on/off section 442 in accordance with the turning-on of the main audio component 410, so that power supply from the fuel cell is started. In accordance with it, the detection operation of the fuel storage quantity by the fuel storage quantity detecting section 435 is started via the management information forming section 434, and power is supplied from the fuel cell while allowing the power supply state to be managed.

Although the audio system 402 is provided with two speaker components 430 and 450 according to the above description, the present fourth embodiment is not limited only to such the case. It may be a case where three or more speaker components are installed instead of such the case. Even in the case of a plurality of speaker components provided, the management information transmitted from each of the speaker components has an allocated IP address peculiar to each speaker component, by which each of the speaker components can surely be identified by the IP address identifying section 414 of the main audio component 410.

Although each of the speaker components 430 and 450 has only the fuel cell installed as the power source according to the above description, the present invention is not limited only to such the case. For example, it is also acceptable to provide each of the speaker components 430 and 450 with a backup power source for enabling communications between the main audio component 410 and each of the speaker components 430 and 450 in a case where the fuel cell becomes unable to function due to the occurrence of abnormality or the like besides the fuel cell in place of such the case. Such the backup power source can be provided by a secondary battery of, for example, a lithium-ion battery that has a little information that should be managed.

Such the secondary cell battery also is provided as a power source for communications between each of the speaker components 430 and 450 and the main audio component 410 when the fuel cell is in a standby state. Furthermore, such the secondary battery may be electrically charged (accumulating electricity) by the fuel cell during the operation of the fuel cell. Otherwise, it is acceptable to provide a solar cell or the like and charge the secondary battery by the solar cell. As described above by charging the secondary battery of a comparatively small electricity accumulation capacity during the operation of the fuel cell, the operating life of the secondary battery can be extended. Moreover, when such the secondary battery is further provided, it is acceptable to improve the convenience of the management of the management information by transmitting the management information (abnormality information, storage power residual quantity information and so on) of the secondary battery to the main audio component 410 by communications. It is, of course, possible to store such the transmitted management information in the main audio component 410 and manage the information as historical information.

For example, the main audio component 410 further includes an operation control section for forming operation control information for the operation control of the fuel cell installed in each of the speaker components 430 and 450 and outputting the formed operation control information to each of the speaker components 430 and 450. It is also possible that, if a reduction in the residual quantity is confirmed on the basis of the residual quantity information of the accumulated electricity of the secondary battery inputted from each speaker component 430 to the main audio component 410, then an instruction signal (e.g., instruction signal for starting charging) of the secondary battery with the power generated by the fuel cell is outputted as the operation control information to each of the speaker components 430 and 450 on the basis of an estimate of the power generation load status of the fuel cell based on the audio signal transmitted from the operation control section to each of the speaker components 430 and 450. By this operation, the charging of the secondary battery can be reliably carried out without influencing the audio output function of the speaker components 430 and 450, and this makes it possible to continuously carry out the stable operation of the audio system 402 as a whole.

Moreover, in a case where a communication system such that the operation control section of such the main audio component 410 transmits the operation control information together with the audio signal to each of the speaker components 430 and 450 via the wireless communication part 9 is adopted, the communication time for transmitting the information can be efficiently shortened.

Particularly, in a case where a packet communication system in which the audio signal is transmitted divided into a plurality of packets is adopted, more efficient communications become possible by carrying out the communications with the operation control information inserted between the packets of the audio signal.

In a case where the fuel cell is equipped with a constituent device of, for example, a fuel pump, an air pump, a concentration sensor, a fuel level sensor, a thermistor or the like, it is acceptable to make the operation control section of the main audio component 410 receive the operation condition of the constituent device as management information, form the operation control information on the basis of the respective piece of management information and output the information to each of the fuel cells. For example, it is possible to receive the detection results of the fuel cell temperature and the fuel concentration as the management information by, for example, the operation control section, form and output the operating condition of the fuel pump such that the generated power output of the fuel cell is stabilized on the basis of management information and execute the control of the fuel concentration or the like on the basis of the information.

By executing such the control, it is possible to manage the operation of a plurality of fuel cells by one device, carry out efficient management and simplify the control architecture provided for each fuel cell.

Although the speaker component 430 and the speaker component 450 are each provided with the control section and the power supply states of the fuel cells installed in the speaker components 430 and 450 can be individually managed according to the above description, the present invention is not limited only to such the case. Instead of such the case, taking advantage of, for example, the feature that the use conditions of each of the speaker components 430 and 450 become approximately uniform due to the fact that the speaker components 430 and 450 are generally provided as a pair of devices for the audio system 402, it is acceptable to provide the control section in either one of the speaker components for the management of the pair of speaker components. In such the case, a fuel cell management system can be provided with a simpler system construction by making the best use of the feature of the audio system that a pair of speaker components are used. However, such the management technique is limited to the case where the residual quantity of fuel storage is mainly managed.

Moreover, it is also possible to, for example, calculate the specific fuel consumption and display the continuously usable time of the audio system 402 in the display section 411 of the main audio component 410 on the basis of the calculation result of the specific fuel consumption and the detection result of the residual quantity of fuel storage in the audio system 402. It is also acceptable to display whether or not the music information recorded on the recording medium inserted in the main audio component 410 is reproducible on the basis of this continuously usable time while allowing the user to recognize it. It is further acceptable to store the use environment (reproduction sound volume and so on) of the audio system 402 by the user as historical information in the main audio component 410 and calculate and display the continuously usable time on the basis of the historical information.

According to the fourth embodiment, the fuel cell management system 401 of the present invention can also be applied to the audio system 402 of one electronic device constructed of a plurality of constituent devices like the main audio component 410 and the speaker components 430 and 450.

With this arrangement, the power supply states of the fuel cells in the speaker components 430 and 450 that are allowed to be freely arranged by the installed fuel cell and the wireless communication part 9 can be comprehensively managed in the main audio component 410 that executes the concentrated management of the reproduction of music information and so on. Therefore, the free layout of the speaker components, according to the intense demanded from the market, can be achieved by achieving the efficient management.

Fifth Embodiment

Figure 12:
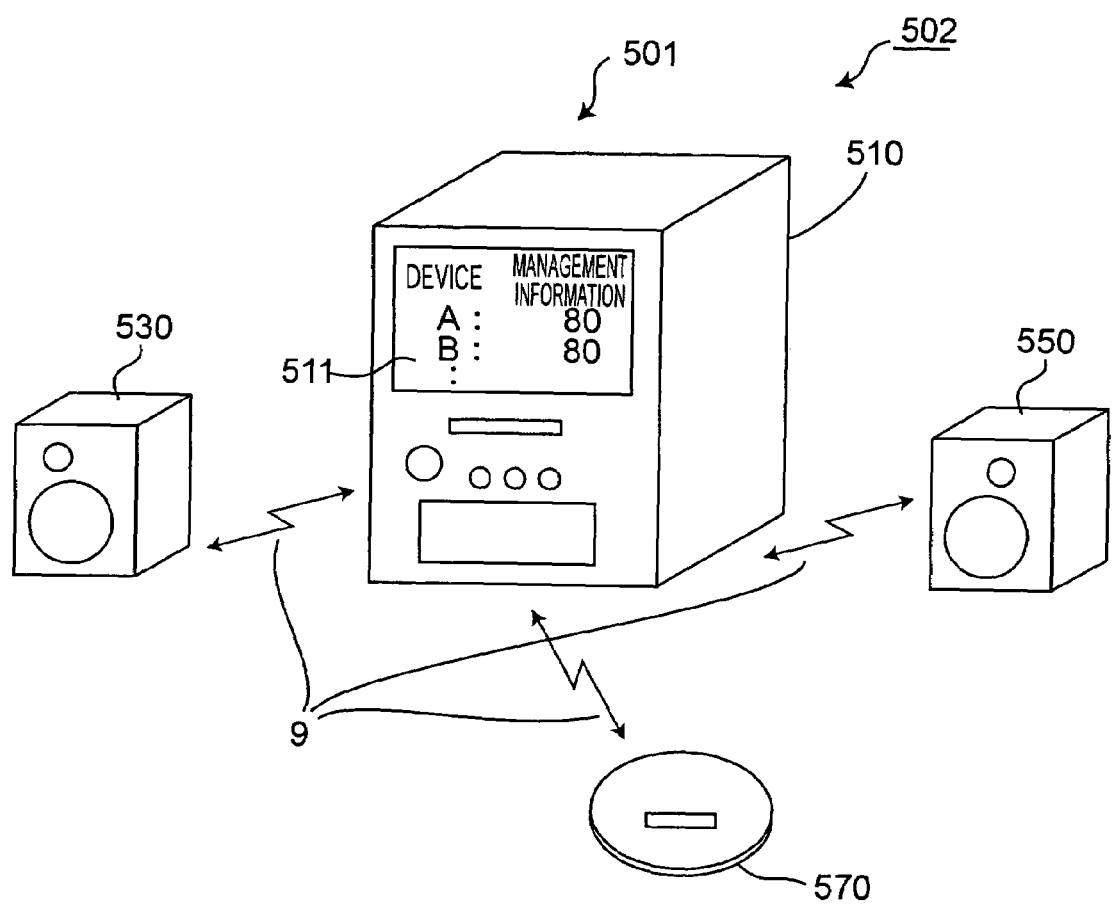
FIG. 12 is a schematic structural view showing the construction of a fuel cell management system according to a fifth embodiment of the present invention.

Next, the schematic structural view of a fuel cell management system 501 according to the fifth embodiment of the present invention is shown in FIG. 12.

As shown in FIG. 12, the fuel cell management system 501 is common to the fuel cell management system 401 of the fourth embodiment in that it is provided for an audio system 502 constructed of a main audio component 510 and two speaker components 530 and 550, but the present system differs from the fuel cell management system 401 of the fourth embodiment in that the fuel cell installed in a CD player of one example of the electronic device from which an audio signal is inputted to the main audio component 410 is also managed by the main audio component 510 besides the speaker components that are the electronic devices to which the audio signal is outputted from the main audio component 410.

As shown in FIG. 12, a CD player 570 in which a fuel cell is installed is able to transfer information between it and the main audio component 510 via the wireless communication part 9. The user can manage each of the fuel cells by transmitting the management information formed in the CD player 570 to the main audio component 510 by this wireless communication part 9 and displaying the management information in a display section 511.

Thus providing the fuel cell management system 501 in the audio system 502 makes it possible to manage the fuel cells of not only the electronic devices to which the audio signal is outputted from the main audio component 510 but also the electronic device from which the audio signal is inputted and apply the fuel cell management system to more various systems.

Although the case where CD player 570 is used as the electronic device from which the audio signal is inputted to the main audio component 510 has been described above, other various electronic devices can be applied in place of such the case.

Sixth Embodiment

Figure 13:
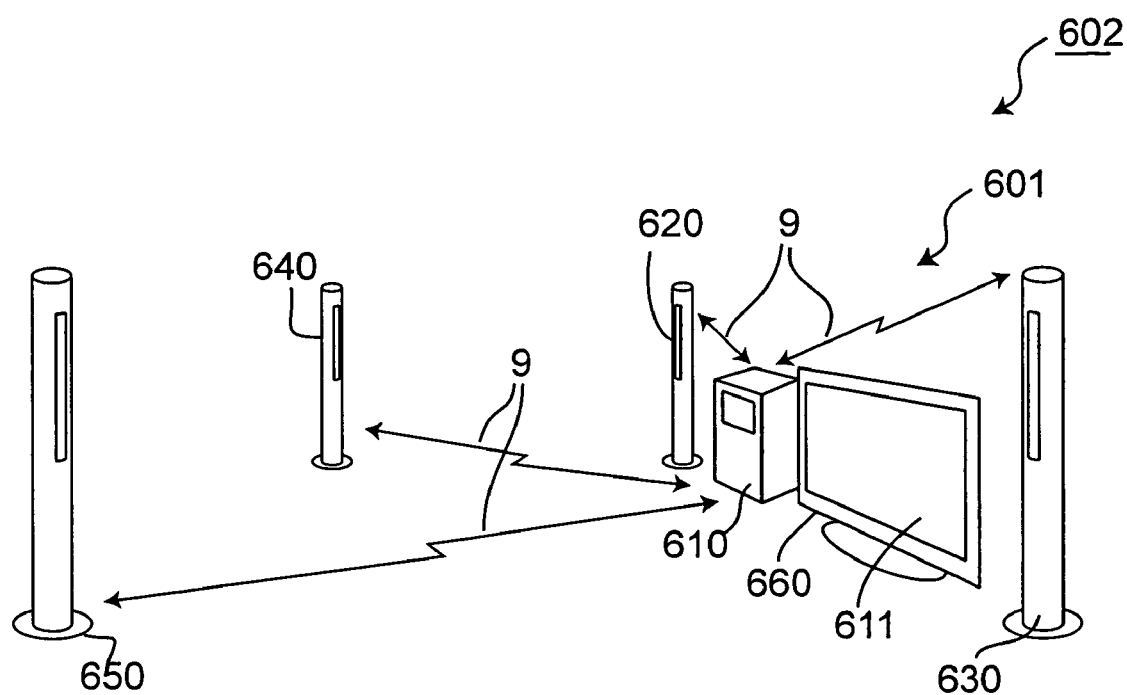
FIG. 13 is a schematic structural view showing the construction of a fuel cell management system according to a sixth embodiment of the present invention.

Next, the schematic structural view of a fuel cell management system 601 according to the sixth embodiment of the present invention is shown in FIG. 13.

As shown in FIG. 13, the fuel cell management system 601 of the present sixth embodiment is common to the fuel cell management system 401 of the fourth embodiment in that it is provided for an audio system 602 constructed of a main audio component 610 and a plurality of speaker components 620, 630, 640 and 650, but the present system differs from the fuel cell management system 401 of the fourth embodiment in that the main audio component 610 that is a management unit for managing the fuel cells and a television display 660 that is a display unit having a display section 611 for displaying the management information are constructed of different devices.

As shown in FIG. 13, in the audio system 602 that is a sound system, the main audio component 610 and each of the speaker components 620, 630, 640 and 650 of one example of the electronic device in which a fuel cell is installed are able to transmit information of the management information and so on by the wireless communication part 9 of one example of the information communication part. Moreover, the main audio component 610 and the television display 660 are able to mutually transmit information. For example, the management information transmitted from each of the speaker components 620 through 650 to the main audio component 610 is identified in the main audio component 610, and the result can be displayed in the display section 611 of the television display 660. Moreover, the display section 611 of the television display 660 is able to display the management information on a subordinate screen (a window or the like) while allowing the user to visually recognize it while displaying a video image or the like. That is, the management information display unit is constructed of the main audio component 610 and the display section 611 of the television display 660 in the present sixth embodiment.

The audio system 602 provided with the fuel cell management system 601 of such the construction does not display the management information on the main audio component 610 but displays the management information on the display section 611 intended for the visual recognition by the user. Therefore, the displayed management information can be made more easily recognizable by the user. Therefore, the fuel cells can be managed efficiently and more reliably.

Although the management information is displayed on the subordinate screen in the display section 611 of the television display 660 according to the above description, the present sixth embodiment is not limited to such the case but allowed to adopt another display method.

By properly combining arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2003-312318 filed on Sep. 4, 2003 including specification, drawing and claims are incorporated herein by reference in its entirety.

What is claimed is:

1. A fuel cell management system for managing plural fuel cells installed in plural electronic devices, respectively, said system comprising:

a plurality of electronic devices, each of which being operated with electric power supplied from respective fuel cell installed in each respective electronic device, each electronic device possessing identification information for identifying the respective electronic devices, for forming management information about a power supply state of the respective installed fuel cell and for outputting the formed management information in correlation with the identification information, a management unit for receiving the identification information and the management information outputted from each of the electronic devices and displaying the management information and an indication of the electronic device that corresponds with the management information based on the received identification information; and an information transmitting part for transmitting the identification information and the management information outputted from each of the electronic devices and allowing the information to be received by the management unit, wherein each of the electronic devices comprises: an electronic device control section, which has a management information forming section for forming the management information according to the power supply state of the respective fuel cell installed in the respective electronic device in response to a power turning-off operation of the respective electronic device and an information output section for outputting the management information about the power supply state of the fuel in the respective electronic device in correlation with the identification information to the management unit via the information transmitting part in response to a power turning-off operation of the respective electronic device, and the management unit is operable to display the power supply state of the fuel cells of the electronic devices based on the inputted management information for managing each of the fuel cells.

2. The fuel cell management system as claimed in claim 1, wherein the management unit comprises:

an information input section for inputting the identification information and the management information via the information transmitting part;

an identification section for identifying the inputted management information as to which electronic device pertains to the management information based on the inputted identification information; and a display section for displaying the management information and the indication of the electronic device that corresponds to the management information.

3. The fuel cell management system as claimed in claim 2, wherein the management information includes at least one piece of: information regarding a residual quantity of fuel storage of the installed fuel cell, information regarding an output voltage in supplying the electric power, information regarding a temperature of the fuel cell, information regarding humidity of the fuel cell, and information regarding a leakage warning of the fuel, each of the electronic device control sections further has a detection section for detecting the at least one piece of information so that the management information is formed in the management information forming section based on the information detected by the detecting section.

4. The fuel cell management system as claimed in claim 1, wherein the management information includes at least one piece of: information regarding a fueling frequency of the installed fuel cell, information regarding an operating time of the fuel cell from a latest fueling time, and information regarding a specific fuel consumption of the fuel, and each of the management information forming sections further has a calculation section for calculating the at least one piece of information.

5. The fuel cell management system as claimed in claim 3, wherein each of the electronic device control sections is operable to:

form the management information in the management information forming section when the respective detection section detects at least one of the following: that the residual quantity of fuel storage becomes equal to or smaller than a prescribed quantity, that a fluctuation of the output voltage becomes equal to or greater than a prescribed value, that the temperature becomes equal to or higher than a prescribed temperature, that the humidity becomes equal to or higher than a prescribed humidity, and that a fuel leakage occurs;

output the formed management information from the information output section; and transmit the management information to the management information display unit via the information transmitting part.

6. The fuel cell management system as claimed in claim 1, wherein the management information display unit further comprises a request signal output section for outputting a request signal for individually requesting each of the electronic device control sections to transmit the management information, and each of the electronic device control sections further comprises a request signal input section for receiving the request signal, and each of the electronic device control sections is operable to output the management information formed in the management information forming section from the information output section.

7. The fuel cell management system as claimed in claim 1, wherein the management information display unit comprises a stop signal output section for outputting a stop signal for stopping the operation of the electronic device identified by the identification information based on the inputted management information via the information transmitting part.

8. The fuel cell management system as claimed in claim 1, wherein the management unit further comprises a management information storage section for retrievably storing the inputted management information so that the management unit displays the management information of the electronic device stored in the storage section in place of the management information to be inputted when the management information is not inputted from the electronic device via the information transmitting part.

9. The fuel cell management system as claimed in claim 1, wherein the information transmitting part is wireless communication part.

10. The fuel cell management system as claimed in claim 1, wherein the identification information is an IP address.

11. The fuel cell management system as claimed in claim 1, wherein the management unit is operable to output audio sounds correlated with the management information.

12. The fuel cell management system as claimed in claim 1, wherein the management unit is operable to display contact information of a dealer or repairer of the electronic devices or the fuel cells together with the management information.

13. An audio system for managing plural fuel cells installed in plural speaker components, respectively, said system comprising:
   a plurality of speaker components, each of which being operated with electric power supplied from a respective fuel cell installed in each respective speaker component, each speaker component possessing identification information for identifying the respective speaker components, for forming management information about a power supply state of the respective installed fuel cell and for outputting the formed management information in correlation with the identification information,
   a main audio component for outputting audio signals to each of the speaker components while allowing the signals to be reproduced by each of the speaker components, the main audio component having a management unit for receiving the identification information and the management information outputted from each of the speaker components and displaying the management information and an indication of the speaker component that corresponds with the management information based on the received identification information; and
   an information transmitting part for transmitting the identification information and the management information outputted from each of the speaker components and allowing the information to be receive by the management unit, wherein
   each of the speaker components comprises: a device control section, including a management information forming section for forming the management information according to the power supply state of the respective fuel cell installed in the respective speaker component in response to a power turning-off operation of the respective speaker component and an information output section for outputting the information about the power supply state of the fuel in the respective speaker component to the management unit via the information transmitting part in response to a power turning-off operation of the respective electronic device, and
   the management information display unit is operable to display the power supply state of the fuel cells of the speaker components based on the inputted management information for managing each of the fuel cells.

14. The audio system as claimed in claim 13, wherein the information transmitting part transmits the management information from each of the speaker components to the main audio component and transmits the audio signals from the main audio component to each of the speaker components.

15. The audio system as claimed in claim 14, wherein
   the main audio component further comprises an operation control section for forming and outputting operation control information for operation control of the fuel cell installed in each of the speaker components based on the management information,
   each of the speaker components further comprises a secondary battery for backup of power necessary for transmitting the management information between each of the electronic device control sections and the main audio component,
   the management information includes information regarding a residual quantity of accumulated electricity of the secondary battery of the fuel cells, and
   the operation control section outputs an instruction signal for charging the secondary battery with electric power generated by the fuel cell as the operation control information based on the information regarding the residual quantity of the accumulated electricity of the secondary battery inputted from the electronic device control section via the information transmitting part and a power generation load estimate of the fuel cell based on the audio signals transmitted to the electronic device control section.

16. The audio system as claimed in claim 15, wherein the operation control section of the main audio component transmits the operation control information together with the audio signals to the electronic device control section of each of the speaker components via the information transmitting part.

* * * * *